US011220161B2

(12) United States Patent
Rose

(10) Patent No.: US 11,220,161 B2
(45) Date of Patent: Jan. 11, 2022

(54) WINDOW DEFLECTOR ASSEMBLY WITH MOUNTING CLIPS

(71) Applicant: Lund, Inc., Buford, GA (US)

(72) Inventor: Brent Lorenz Rose, Jefferson, GA (US)

(73) Assignee: Lund, Inc., Buford, GA (US)

( * ) Notice: Subject to any disclaimer, the term of this patent is extended or adjusted under 35 U.S.C. 154(b) by 218 days.

(21) Appl. No.: 16/600,933

(22) Filed: Oct. 14, 2019

(65) Prior Publication Data
US 2020/0130479 A1 Apr. 30, 2020

Related U.S. Application Data

(60) Provisional application No. 62/751,152, filed on Oct. 26, 2018.

(51) Int. Cl.
*B60J 1/20* (2006.01)

(52) U.S. Cl.
CPC .................. *B60J 1/2002* (2013.01)

(58) Field of Classification Search
CPC ........... B60J 1/20; B60J 1/2002; B60J 1/2008
USPC ................................... 296/152, 154
See application file for complete search history.

(56) References Cited

U.S. PATENT DOCUMENTS

| D23,794 S | 11/1894 | Marks |
| D50,345 S | 2/1917 | Green |
| D50,346 S | 2/1917 | Green |
| 1,453,340 A | 5/1923 | Druar |
| 1,588,654 A | 6/1926 | Brownlee |
| 1,787,035 A | 12/1930 | Davis |
| 1,811,527 A | 6/1931 | Young |
| D85,241 S | 9/1931 | Henderson |
| 1,825,192 A | 9/1931 | Mace |
| 2,054,538 A | 9/1936 | Graves et al. |
| 2,059,305 A | 11/1936 | Best |

(Continued)

FOREIGN PATENT DOCUMENTS

| CA | 64 701 A | 11/1899 |
| CA | 76 555 A | 7/1902 |

(Continued)

OTHER PUBLICATIONS

Bushwacker, "Bushwacker 10063-07 Jeep Flat Style Fender Flare—Rear Pair," Amazon.com, published Jun. 15, 2010 (retrieved from the internet Sep. 9, 2019). Internet URL:<https://www.amazon.com/dp/B004BZLA22/ref+psdc_15709431_t1_B003S6GSQI>(Year: 2010).

(Continued)

*Primary Examiner* — Jason S Daniels
(74) *Attorney, Agent, or Firm* — Knobbe, Martens, Olson & Bear, LLP

(57) ABSTRACT

A window deflector assembly which can be installed within a window channel of a window frame of a vehicle. The window deflector assembly can include a window deflector and a mounting clip. The mounting clip can provide greater securement to the window deflector by securing to both sides of a window channel and can include structure which can grip a portion of the window deflector on both sides. The mounting clip can be curved to aid installation of the clip into the window channel and to better distribute the load from the window deflector to sides of the window channel.

20 Claims, 23 Drawing Sheets

(56) References Cited

U.S. PATENT DOCUMENTS

| | | |
|---|---|---|
| 2,073,159 A | 3/1937 | Lintern et al. |
| 2,106,418 A | 1/1938 | Wagner |
| 2,184,798 A | 12/1939 | Gracey |
| 2,236,846 A | 4/1941 | Davisson |
| 2,281,840 A | 5/1942 | Hamilton |
| 2,475,901 A | 7/1949 | Kipp |
| D154,735 S | 8/1949 | Airbib |
| D154,861 S | 8/1949 | Maher |
| D156,679 S | 12/1949 | Stiles |
| D157,555 S | 3/1950 | Abrams |
| D159,144 S | 6/1950 | Dieterich |
| 2,534,763 A | 12/1950 | Flavin |
| 2,566,934 A | 9/1951 | Dieterich |
| 2,567,501 A | 9/1951 | Zeis |
| 2,599,809 A | 6/1952 | Branch |
| D167,676 S | 9/1952 | Chicorel |
| 2,749,830 A | 6/1956 | Landon |
| 2,757,954 A | 8/1956 | Hurley |
| 2,777,732 A | 1/1957 | Walsh |
| 2,792,254 A | 5/1957 | Hagglund |
| 2,793,705 A | 5/1957 | Garrity |
| 2,857,973 A | 10/1958 | Garrity |
| 2,859,680 A | 11/1958 | Edwards |
| 2,949,842 A | 8/1960 | Crandall |
| 3,015,517 A | 1/1962 | Thornburgh |
| 3,022,848 A | 2/1962 | Bennett |
| D201,496 S | 6/1965 | Stef |
| 3,214,216 A | 10/1965 | Brown, Jr. |
| 3,434,408 A | 3/1969 | Rivers |
| 3,487,420 A | 12/1969 | Herr |
| 3,678,635 A | 7/1972 | Vagi et al. |
| 3,695,674 A | 10/1972 | Baker |
| 3,728,537 A | 4/1973 | Barenyi et al. |
| 3,736,404 A | 5/1973 | Eisler |
| 3,785,699 A | 1/1974 | Molaskey |
| 3,815,700 A | 6/1974 | Mittendorf |
| 3,866,524 A | 2/1975 | Forbes, Jr. |
| 3,866,527 A | 2/1975 | Katris |
| D239,705 S | 4/1976 | Lund |
| 3,987,863 A | 10/1976 | Mittendorf |
| 4,018,472 A | 4/1977 | Mason, Jr. |
| 4,039,221 A | 8/1977 | Eady |
| 4,040,656 A | 8/1977 | Clenet |
| 4,043,587 A | 8/1977 | Giallourakis |
| 4,052,099 A | 10/1977 | Lowery et al. |
| 4,063,773 A | 12/1977 | Modesette |
| 4,089,256 A | 5/1978 | Furcini |
| 4,099,760 A | 7/1978 | Mascotte |
| 4,149,749 A | 4/1979 | Canal |
| 4,153,129 A | 5/1979 | Redmond |
| 4,159,845 A | 7/1979 | Bratsberg |
| D252,680 S | 8/1979 | Kingsley et al. |
| 4,169,608 A | 10/1979 | Logan |
| 4,174,021 A | 11/1979 | Barlock |
| 4,174,850 A | 11/1979 | Hart |
| 4,178,034 A | 12/1979 | Mittendorf |
| 4,191,097 A | 3/1980 | Groen |
| 4,219,870 A | 8/1980 | Haraden et al. |
| D256,793 S | 9/1980 | Logan |
| 4,262,954 A | 4/1981 | Thompson |
| D259,873 S | 7/1981 | Milner |
| D261,500 S | 10/1981 | Butler |
| 4,309,056 A | 1/1982 | Long |
| 4,320,919 A | 3/1982 | Butler |
| D264,833 S | 6/1982 | Trombley et al. |
| 4,347,781 A | 9/1982 | Hassell |
| 4,364,591 A | 12/1982 | Bien |
| 4,412,698 A | 11/1983 | Kingsley |
| D272,429 S | 1/1984 | Trombley et al. |
| 4,423,668 A | 1/1984 | Long |
| D273,672 S | 5/1984 | Lund |
| 4,447,067 A | 5/1984 | Yamashita |
| 4,471,991 A | 9/1984 | Matthias |
| 4,476,774 A | 10/1984 | Liberto et al. |
| 4,493,577 A | 1/1985 | Cosenza |
| 4,527,466 A | 7/1985 | Kossor et al. |
| 4,547,013 A | 10/1985 | McDaniel |
| D283,120 S | 3/1986 | Trombley et al. |
| D283,611 S | 4/1986 | Kingsley |
| 4,592,937 A | 6/1986 | Nagata et al. |
| D284,565 S | 7/1986 | Trombley et al. |
| 4,605,238 A | 8/1986 | Arenhold |
| 4,621,824 A | 11/1986 | Arenhold |
| 4,627,657 A | 12/1986 | Daniels et al. |
| D288,309 S | 2/1987 | Lund |
| D288,310 S | 2/1987 | Lund |
| 4,671,552 A | 6/1987 | Anderson et al. |
| D291,295 S | 8/1987 | Lund |
| 4,685,718 A * | 8/1987 | Steenblik ............... B60J 1/20 296/154 |
| 4,700,980 A | 10/1987 | Josefczak |
| 4,707,014 A | 11/1987 | Rich |
| 4,709,938 A | 12/1987 | Ward et al. |
| 4,726,619 A | 2/1988 | Haugestad |
| D294,707 S | 3/1988 | Cameron |
| 4,750,549 A | 6/1988 | Ziegler et al. |
| 4,756,242 A | 7/1988 | Keith |
| 4,758,040 A | 7/1988 | Kingsley |
| 4,776,627 A | 10/1988 | Hutto |
| 4,784,430 A | 11/1988 | Biermacher |
| D299,713 S | 2/1989 | Dunham |
| 4,819,136 A | 4/1989 | Ramsey |
| D300,918 S | 5/1989 | Turner |
| D301,028 S | 5/1989 | Buck |
| D301,450 S | 6/1989 | Kingsley |
| 4,842,319 A | 6/1989 | Ziegler et al. |
| 4,842,320 A | 6/1989 | Kingsley |
| 4,842,912 A | 6/1989 | Hutter, III |
| 4,844,529 A | 7/1989 | O'Saben |
| D304,437 S | 11/1989 | Eash |
| D304,819 S | 11/1989 | Chapman et al. |
| 4,904,014 A | 2/1990 | Azarovitz et al. |
| 4,923,241 A | 5/1990 | Miller |
| 4,929,013 A | 5/1990 | Eke |
| 4,966,404 A | 10/1990 | Lund |
| D312,238 S | 11/1990 | Lund |
| D319,209 S | 8/1991 | Miller |
| 5,042,551 A | 8/1991 | Ein et al. |
| 5,048,868 A | 9/1991 | Arenhold |
| 5,067,760 A | 11/1991 | Moore |
| 5,082,321 A | 1/1992 | Brewer |
| 5,112,095 A | 5/1992 | Lund et al. |
| 5,114,205 A | 5/1992 | Jee |
| D326,636 S | 6/1992 | Barth |
| 5,120,082 A | 6/1992 | Ito |
| 5,130,906 A | 7/1992 | Lund |
| 5,150,941 A | 9/1992 | Silzer et al. |
| 5,183,303 A | 2/1993 | Zoller |
| 5,215,343 A | 6/1993 | Fortune |
| 5,234,247 A | 8/1993 | Pacer |
| 5,238,268 A | 8/1993 | Logan |
| 5,251,953 A * | 10/1993 | Willey ............... B60J 1/2002 296/152 |
| 5,280,386 A | 1/1994 | Johnson et al. |
| 5,284,376 A | 2/1994 | Zweigart |
| 5,308,134 A | 5/1994 | Stanesic |
| D348,242 S | 6/1994 | Tsao |
| 5,320,461 A | 6/1994 | Stanesic |
| 5,340,154 A | 8/1994 | Scott |
| 5,348,363 A | 9/1994 | Fink |
| 5,353,571 A | 10/1994 | Berdan et al. |
| D352,491 S | 11/1994 | Galasso |
| 5,403,059 A | 4/1995 | Turner |
| 5,456,786 A | 10/1995 | Cook et al. |
| 5,460,425 A | 10/1995 | Stephens |
| 5,475,956 A | 12/1995 | Agrawal et al. |
| 5,522,634 A | 6/1996 | Stanesic et al. |
| D375,068 S | 10/1996 | Lund |
| 5,595,416 A | 1/1997 | Horwill |
| 5,613,710 A | 3/1997 | Waner |
| D379,956 S | 6/1997 | Baughman |
| 5,636,892 A | 6/1997 | Gordon |
| 5,651,566 A | 7/1997 | Arenhold |
| D382,239 S | 8/1997 | Logan et al. |

(56) References Cited

U.S. PATENT DOCUMENTS

| | | |
|---|---|---|
| 5,660,428 A | 8/1997 | Catlin |
| 5,664,871 A | 9/1997 | Thompson |
| 5,676,418 A | 10/1997 | Strefling |
| 5,683,293 A | 11/1997 | Mohammed |
| 5,697,644 A | 12/1997 | Loga et al. |
| 5,718,283 A | 2/1998 | Naty et al. |
| 5,722,690 A | 3/1998 | Ward et al. |
| 5,755,483 A | 5/1998 | Lund |
| D395,365 S | 6/1998 | Verbeek et al. |
| D395,421 S | 6/1998 | Gable et al. |
| 5,791,719 A | 8/1998 | Alley |
| 5,797,645 A | 8/1998 | Schenk et al. |
| 5,823,553 A | 10/1998 | Thompson |
| 5,829,786 A | 11/1998 | Dahl |
| 5,851,044 A | 12/1998 | Lund |
| D403,639 S | 1/1999 | Gale et al. |
| D404,698 S | 1/1999 | Schenk et al. |
| 5,925,425 A | 7/1999 | Nelson |
| 5,879,045 A | 9/1999 | Logan |
| D415,354 S | 10/1999 | Horwill et al. |
| 5,984,401 A | 11/1999 | Hannah |
| 5,988,305 A | 11/1999 | Sakai et al. |
| 6,019,414 A | 2/2000 | Pourciau, Sr. |
| 6,027,156 A | 2/2000 | Lund et al. |
| 6,042,473 A | 3/2000 | McClary |
| D422,541 S | 4/2000 | Richter |
| D424,495 S | 5/2000 | Damon et al. |
| D424,496 S | 5/2000 | Damon et al. |
| 6,070,908 A | 6/2000 | Skrzypchak |
| 6,099,064 A | 8/2000 | Lund |
| 6,099,065 A | 8/2000 | Lund |
| D431,511 S | 10/2000 | Damon et al. |
| D432,476 S | 10/2000 | Damon et al. |
| 6,131,681 A | 10/2000 | Nelson et al. |
| D436,335 S | 1/2001 | Beigel |
| 6,193,278 B1 | 2/2001 | Ward et al. |
| D438,495 S | 3/2001 | Bobo |
| 6,205,642 B1 | 3/2001 | Czirmer |
| 6,350,195 B1 | 2/2002 | Iino |
| 6,460,914 B2 | 10/2002 | Gille et al. |
| D467,018 S | 12/2002 | Shih et al. |
| 6,511,109 B1 | 1/2003 | Schultz et al. |
| D472,655 S | 4/2003 | Lin |
| 6,547,305 B1 | 4/2003 | Ellis |
| 6,547,306 B2 | 4/2003 | Espinose et al. |
| 6,551,540 B1 | 4/2003 | Porter |
| 6,557,927 B2 | 5/2003 | Kanie |
| D478,303 S | 8/2003 | Iverson et al. |
| D478,538 S | 8/2003 | Iverson et al. |
| D482,992 S | 12/2003 | Hattori et al. |
| D483,312 S | 12/2003 | Saleen |
| 6,682,126 B2 | 1/2004 | Kanie |
| D488,751 S | 4/2004 | Szczesny |
| 6,722,730 B2 | 4/2004 | Lydan et al. |
| D490,176 S | 5/2004 | Lin |
| 6,736,353 B1 | 5/2004 | Erben |
| D491,858 S | 6/2004 | Velazco |
| 6,752,446 B2 | 6/2004 | Espinose et al. |
| 6,805,389 B1 | 10/2004 | Schellenberg |
| 6,810,950 B1 | 11/2004 | Manze, III |
| 6,830,119 B2 | 12/2004 | Whitworth |
| 6,854,545 B1 | 2/2005 | Elwell |
| 6,910,316 B2 | 6/2005 | Espinose et al. |
| 6,959,948 B2 | 11/2005 | Varnhagen et al. |
| D516,481 S | 3/2006 | Metros et al. |
| D517,965 S | 3/2006 | Metros et al. |
| 7,028,797 B2 | 4/2006 | White |
| 7,029,051 B2 | 4/2006 | Espinose et al. |
| 7,036,873 B2 | 5/2006 | Pommeret et al. |
| 7,044,524 B2 | 5/2006 | Luetze et al. |
| D522,427 S | 6/2006 | Beigel et al. |
| 7,114,749 B2 | 10/2006 | Ward |
| 7,131,683 B1 | 11/2006 | Gong |
| D533,810 S | 12/2006 | Metsugi et al. |
| D533,820 S | 12/2006 | Sonoda et al. |
| 7,144,075 B2 | 12/2006 | Shishikura |
| 7,156,452 B2 | 1/2007 | Schumacher et al. |
| 7,166,350 B2 | 1/2007 | Murayama |
| D536,809 S | 2/2007 | James |
| 7,172,240 B1 | 2/2007 | Kaufman |
| D539,710 S | 4/2007 | Kouyama |
| 7,204,543 B2 | 4/2007 | Mishimaji |
| 7,222,884 B2 | 5/2007 | Callan et al. |
| D545,253 S | 6/2007 | Jones |
| 7,232,246 B2 | 6/2007 | Kleber et al. |
| D546,253 S | 7/2007 | Lee et al. |
| D546,935 S | 7/2007 | Arrowood |
| 7,246,842 B2 | 7/2007 | Yamada |
| D548,660 S | 8/2007 | Jenkins |
| D556,657 S | 12/2007 | Elwell et al. |
| D564,414 S | 3/2008 | Okue |
| D564,425 S | 3/2008 | Okue |
| 7,377,564 B1 | 5/2008 | Baffy et al. |
| D570,509 S | 6/2008 | Logan |
| D570,754 S | 6/2008 | Kim et al. |
| D580,328 S | 11/2008 | Jones |
| D582,825 S | 12/2008 | Logan |
| D586,270 S | 2/2009 | Suga et al. |
| D590,756 S | 4/2009 | Williams et al. |
| D591,654 S | 5/2009 | Williams et al. |
| D591,655 S | 5/2009 | Golden et al. |
| D591,656 S | 5/2009 | Golden et al. |
| D591,657 S | 5/2009 | Golden et al. |
| D591,658 S | 5/2009 | Golden et al. |
| 7,537,253 B2 | 5/2009 | Rosen et al. |
| 7,578,527 B2 | 8/2009 | Iverson et al. |
| 7,589,622 B2 | 9/2009 | Farley |
| D608,546 S | 1/2010 | Dicker et al. |
| D610,511 S | 2/2010 | Dubanowski et al. |
| 7,717,467 B2 | 5/2010 | Iverson |
| 7,762,876 B2 | 7/2010 | McClary |
| 7,766,356 B2 | 8/2010 | Iverson |
| D623,103 S | 9/2010 | Braga |
| 7,857,352 B2 | 12/2010 | Logan |
| D644,972 S | 9/2011 | Beigel et al. |
| 8,061,747 B2 | 11/2011 | Shoup et al. |
| 8,118,329 B2 | 2/2012 | Braga |
| 8,127,501 B2 | 3/2012 | Nakao |
| 8,147,300 B2 | 4/2012 | Lunghofer |
| 8,360,500 B2 | 1/2013 | Mishimagi |
| 8,382,193 B2 | 2/2013 | Ezaka |
| D688,611 S | 8/2013 | Liao |
| D688,612 S | 8/2013 | Liao |
| D695,171 S | 12/2013 | Riggs et al. |
| D699,169 S | 2/2014 | Waclawski et al. |
| 8,651,554 B1 | 2/2014 | Patelczyk et al. |
| D704,614 S | 5/2014 | Larson |
| D707,164 S | 6/2014 | Lee |
| D712,324 S | 9/2014 | McFarlin et al. |
| 8,998,290 B2 | 4/2015 | Serentill et al. |
| 9,121,426 B2 | 9/2015 | Jagoda |
| D744,385 S | 12/2015 | Harriton |
| 9,272,605 B1 | 3/2016 | Gong |
| 9,302,639 B2 | 4/2016 | Patelczyk |
| D762,147 S | 7/2016 | Messale et al. |
| D763,754 S | 8/2016 | Sanders et al. |
| D765,569 S | 9/2016 | Hall et al. |
| D778,795 S | 2/2017 | Johns et al. |
| 9,616,945 B1 | 4/2017 | Henderson et al. |
| 9,630,481 B2 | 4/2017 | Rose et al. |
| 9,650,005 B2 | 5/2017 | Patelczyk et al. |
| D792,822 S | 7/2017 | Platto et al. |
| D795,767 S | 8/2017 | Platto et al. |
| D795,768 S | 8/2017 | Platto et al. |
| D801,896 S | 11/2017 | Ito et al. |
| 9,834,161 B2 | 12/2017 | Mettler |
| 9,878,600 B2 | 1/2018 | Rose et al. |
| D814,354 S | 4/2018 | Fisker |
| 10,081,322 B2 | 9/2018 | Patelczyk et al. |
| 10,166,844 B2 | 1/2019 | Rose et al. |
| D839,806 S | 2/2019 | Chi |
| D841,549 S | 2/2019 | Hopkins |
| 10,266,038 B2 | 4/2019 | Serentill et al. |
| D851,001 S | 6/2019 | Guo |

(56) References Cited

U.S. PATENT DOCUMENTS

| | | |
|---|---|---|
| D855,519 S | 8/2019 | Bundy et al. |
| D856,878 S | 8/2019 | Harriton et al. |
| D857,571 S | 8/2019 | Harriton et al. |
| D858,385 S | 9/2019 | Phillips |
| D858,386 S | 9/2019 | Wymore et al. |
| D860,082 S | 9/2019 | Poyorena et al. |
| D860,083 S | 9/2019 | Poyorena et al. |
| D861,561 S | 10/2019 | Mallicote et al. |
| D863,159 S | 10/2019 | Goodrich et al. |
| D867,245 S | 11/2019 | Ito et al. |
| D870,620 S | 12/2019 | Hallgren |
| D875,006 S | 2/2020 | DiCanzio |
| 10,611,215 B2 | 4/2020 | Rose et al. |
| 10,625,696 B2 | 4/2020 | Crismon |
| D883,156 S | 5/2020 | Joudo |
| 10,647,280 B2 | 5/2020 | Patelczyk et al. |
| 10,675,953 B2 | 6/2020 | Serentill et al. |
| D898,640 S | 10/2020 | Rose |
| D906,200 S | 12/2020 | Bibb, VI |
| D906,202 S | 12/2020 | Bibb, VI |
| D910,516 S | 2/2021 | Radbrink |
| 2001/0040383 A1 | 11/2001 | Lund et al. |
| 2002/0079716 A1 | 6/2002 | Espinose |
| 2002/0158460 A1 | 10/2002 | Logan |
| 2003/0178870 A1 | 9/2003 | Angelo et al. |
| 2003/0178879 A1 | 9/2003 | Uramichi |
| 2003/0184113 A1 | 10/2003 | Espinose et al. |
| 2004/0006855 A1 | 1/2004 | Kinzel |
| 2004/0140664 A1 | 7/2004 | Ward |
| 2004/0189037 A1 | 9/2004 | Espinose et al. |
| 2005/0204703 A1 | 9/2005 | Espinose et al. |
| 2005/0217911 A1 | 10/2005 | Cheng |
| 2005/0275212 A1 | 12/2005 | Angelaitis |
| 2006/0049663 A1 | 3/2006 | Kodama et al. |
| 2006/0181088 A1 | 8/2006 | Cobble et al. |
| 2006/0226678 A1 | 10/2006 | Chang |
| 2008/0001390 A1 | 1/2008 | Iverson |
| 2008/0217958 A1 | 9/2008 | Banry et al. |
| 2008/0311349 A1 | 12/2008 | Johnson |
| 2010/0007169 A1 | 1/2010 | Nguyen |
| 2012/0073767 A1 | 3/2012 | Graziano |
| 2012/0144648 A1 | 6/2012 | Iwamoto |
| 2012/0205941 A1 | 8/2012 | Chou |
| 2013/0270870 A1 | 10/2013 | O'Brien |
| 2014/0125046 A1 | 5/2014 | Yen |
| 2015/0021937 A1 | 1/2015 | Perez |
| 2016/0001640 A1 | 1/2016 | Serentill et al. |
| 2016/0144902 A1 | 5/2016 | Avalos Sartorio et al. |
| 2016/0280278 A1 | 9/2016 | Jaynes |
| 2016/0280281 A1 | 9/2016 | Dyck et al. |
| 2017/0021786 A1 | 1/2017 | Lee |
| 2018/0118142 A1 | 5/2018 | Wymore |
| 2018/0229646 A1 | 8/2018 | Van Buren et al. |
| 2018/0272961 A1 | 9/2018 | Gust |
| 2019/0126991 A1 | 5/2019 | Wymore et al. |
| 2019/0210433 A1 | 7/2019 | Serentill |
| 2019/0233020 A1 | 8/2019 | Frederick et al. |
| 2019/0276091 A1 | 9/2019 | Higgs |
| 2020/0130479 A1 | 4/2020 | Rose |
| 2020/0130621 A1 | 4/2020 | Gauci |
| 2020/0398647 A1 | 12/2020 | Serentill et al. |

FOREIGN PATENT DOCUMENTS

| | | |
|---|---|---|
| CA | 2 819 150 | 10/2019 |
| CN | 304219598 | 7/2017 |
| CN | 304219599 | 7/2017 |
| CN | 304219600 | 7/2017 |
| CN | 304292499 | 9/2017 |
| DE | 39 32 142 | 4/1990 |
| DE | 38 43 803 A1 | 7/1990 |
| EP | 0 447 640 | 9/1991 |
| FR | 1 067 336 A | 6/1954 |
| FR | 1 096 819 A | 6/1955 |
| FR | 1 121 035 A | 7/1956 |
| GB | 73 47 43 A | 8/1955 |
| GB | 82 91 54 A | 2/1960 |
| GB | 2 046 183 | 11/1980 |
| JP | 61-057471 | 3/1986 |
| JP | 63-130479 | 6/1988 |
| JP | 2000-296738 A | 10/2000 |
| JP | D1163501 | 1/2003 |
| JP | 2010-149758 | 7/2010 |
| JP | 2013-091427 A | 4/2015 |
| JP | 2013-147169 A | 3/2016 |

OTHER PUBLICATIONS

Bushwacker, "Bushwacker 10064-07 Jeep Flat Style Fender Flare—Rear Pair," Amazon.com, published Jun. 15, 2010 (retrieved from the internet Sep. 9, 2019). Internet URL:<https://www.amazon.com/Bushwacker-10064-07-Style-Fender-Flare/dp/B003S6GSQI> (Year:2010).

Bushwacker gives SEMA Show attendees chance to vote on fender flare concepts https://www.searchautoparts.com/aftermarket-business/news-distribution/bushwacker-gives-sema-show-attendees-chance-vote-fender-flare Posted Nov. 7, 2018 (Year:2018).

Jayerouth, "Xenon Fender Flares Installed," JK-Forum.com, published Nov. 18, 2007 (Retrieved from the Internet Jun. 3, 2020). Internet URL: <https://www.jk-forum.comforums/jk-show-tell-33/xenon-fender-flares-installed-20927/> (Year: 2007).

"Jeep Wrangler JK Snyper Tubular Fender Flares—Textured Black (2007-2018) Review & Install," ExtremeTerrain.com. YouTube, published Jul. 12, 2018 (Retreived from the Internet Jun. 3, 2020). Internet URL:<https://www.youtube.com/watch?v=lPiCfdiq4>(Year: 2018).

"JK Rear Crusher Flares," Poison Spyder Customs, published Aug. 16, 2017 (Retrieved from the Internet Jun. 3, 2020). Internet URL: <https//web.archive.org/web/20170816033721/https://shop.poisonspyder.com/JK-Rear_Crusher-Flares-Extra-Wide-Steel-p/17-05-020.htm>(Year: 2017).

2007 Toyota Camry SE Road Test, Barry Windfield, Mar. 2006, Car and Driver http://caranddriver.com/reviews/2007-toyota-camry-se-road-test.

\* cited by examiner

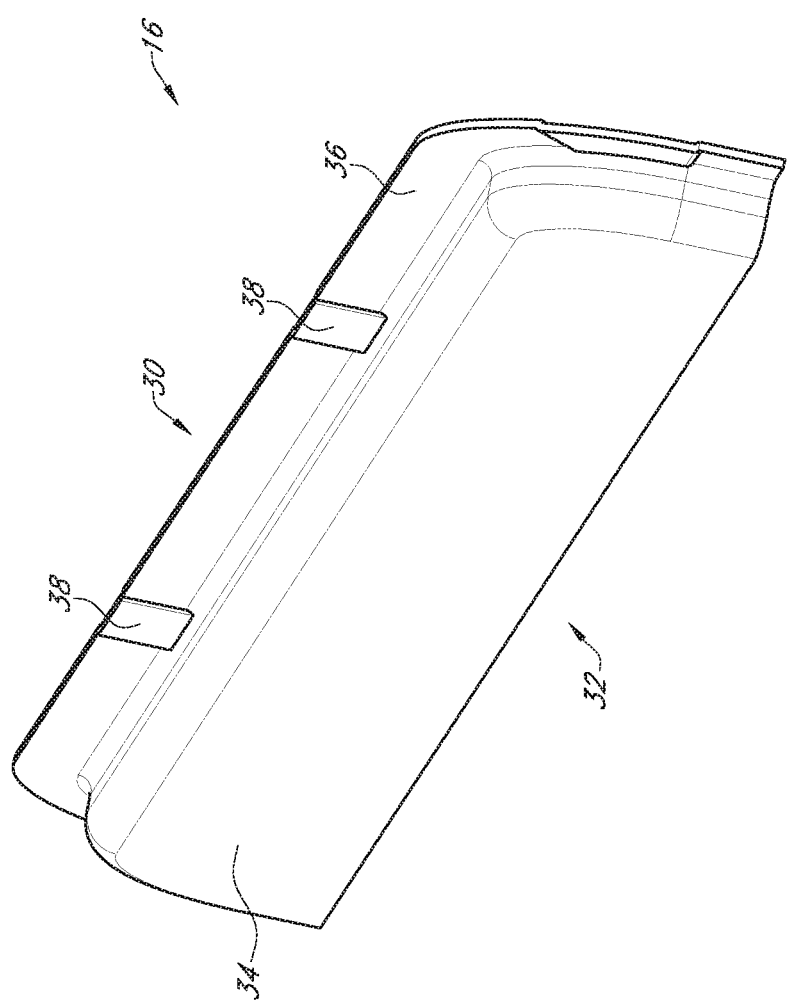

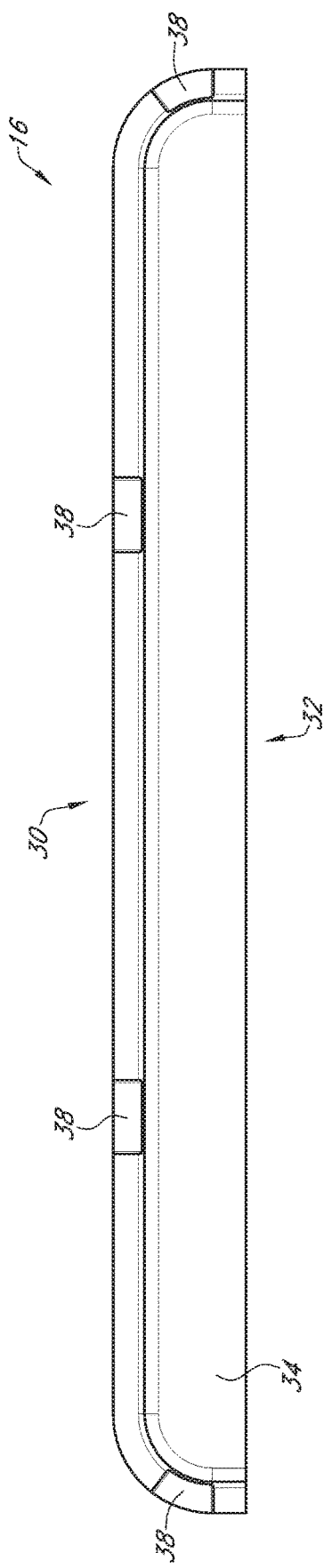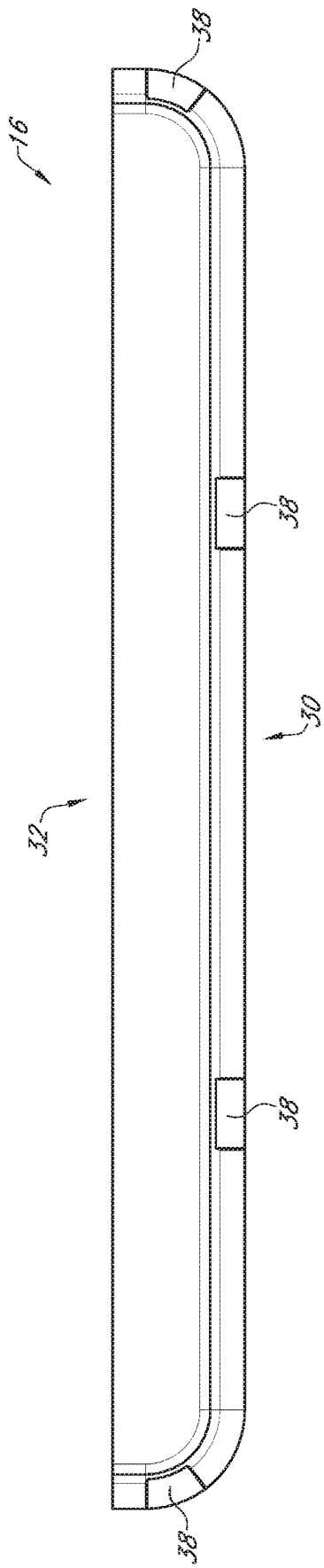

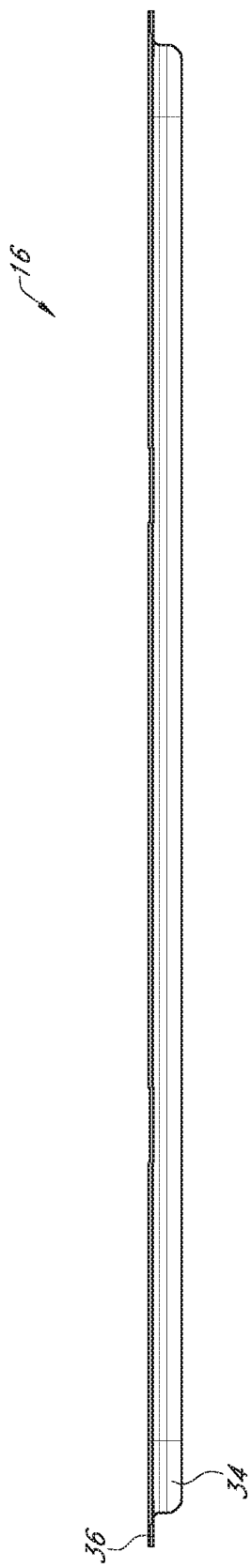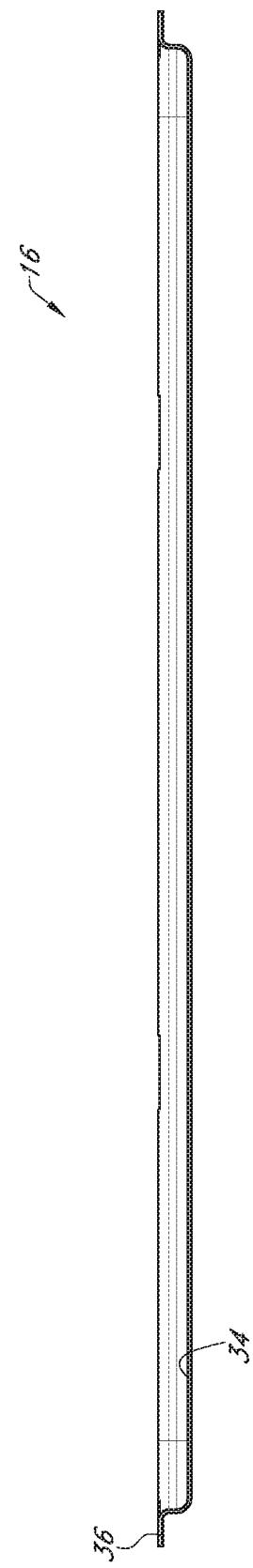

WINDOW DEFLECTOR ASSEMBLY WITH MOUNTING CLIPS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This disclosure relates generally to a window deflector assembly including a window deflector and mounting clips for securing the same to a window frame of a vehicle.

Description of the Related Art

Window deflectors, such as side window deflectors, have previously been used to keep rain and other elements out of vehicles while the window is open or partially open. Window deflectors are typically installed within window channels housed within window frames of vehicles. Such installation typically utilizes tape to secure the window deflector to the window channel and/or utilizes other mechanical securement techniques to secure the window deflector to the window channel.

SUMMARY

The systems, methods, and devices of this disclosure each have several innovative aspects, no single one of which is solely responsible for the desirable attributes disclosed herein.

Disclosed herein is a window deflector assembly for a window frame of a vehicle that can comprise a window deflector and one or more mounting clips. In some embodiments, the window deflector comprises a first section configured to extend upward into the window frame when the window deflector assembly is installed and a second section configured to extend below the window frame when the window deflector assembly is installed. In some embodiments, the first section is integral with the second section. The one or more mounting clips can be configured to secure to a window channel within the window frame. In some embodiments, the one or more mounting clips comprise a top portion, an outer stem, and an inner stem. The top portion can have a first end configured to engage a first side of the window channel and a second end configured to engage a second side of the window channel. The outer stem can extend from the top portion. The inner stem can extend from the top portion and be spaced from the outer stem. In some embodiments, the space between the outer and inner stems is configured to receive and grip a portion of the first section of the window deflector. The inner stem can comprise a first face and a second face opposite the first face, wherein the first face faces and is positioned adjacent to the first section of the window deflector when the window deflector is secured between the outer and inner stems. When the window deflector assembly is installed in the window frame and a window of the vehicle is in a closed position, the second face of the inner stem can face and be positioned proximate to the window.

In some embodiments of the window deflector assembly, the first end of the top portion can comprise a plurality of laterally spaced engagement portions configured to extend outward beyond an end of at least one protrusion on the first side of the window channel. In some embodiments, each of the plurality of laterally spaced engagement portions are tapered from sides of the engagement portions to form a pointed tip. In some embodiments, the second end of the top portion comprises a plurality of laterally spaced engagement portions configured to extend outward beyond an end of at least one protrusion on the second side of the window channel. The window channel can be made of rubber. In some embodiments, the top portion is curved downwardly toward the first end and curved downwardly toward the second end. In some embodiments, the first and second ends of the top portion comprise at least one engagement portion configured to extend outward beyond an end of at least one protrusion on the first and second sides of the window channel and engage the at least one protrusion, wherein the at least one protrusion is angled such that when engaged by the at least one engagement portion, a contacting surface of the at least one protrusion lays adjacent to a contacting surface of the at least one engagement portion.

In some embodiments, the top portion further comprises a body and a tail narrower than the body, wherein the body extends from the second end to a transition region of the top portion and the tail extends from the first end to the transition region, wherein the tail and the outer stem are formed from cutting an inner portion of the inner stem leaving an opening in the inner stem. In some embodiments, the inner stem extends from the transition region of the top portion. In some embodiments, the top portion further comprises a first length from the transition region to the second end and a second length from the transition region to the first end, and wherein the first length is greater than the second length.

In some embodiments, the outer stem of the one or more mounting clips has a cantilevered end which is flared towards the first side of the window channel and is configured to engage a protrusion on the window channel when the mounting clip is installed. In some embodiments, the outer stem comprises one or more engagement portions configured to engage the portion of the first section of the window deflector when the window deflector is secured between the outer and inner stems.

In some embodiments, the portion of the first section of the window deflector defines a recess, and wherein the recess is sized to receive the inner stem of the mounting clip. The thickness of the recess can be substantially equal to a thickness of the inner stem. For example, the thickness of the recess can be within 10% of the thickness of the inner stem, or within 5% of the thickness of the inner stem.

Disclosed herein is a vehicle that can comprise a window frame, a window channel, a window deflector, and a mounting clip. The window frame can comprise an interior side positioned adjacent to an interior of the vehicle and an exterior side opposite the interior side. The window channel can be positioned within the window frame and can comprise an interior side adjacent to the interior side of the window frame and an exterior side adjacent to the exterior side of the window frame. In some embodiments, a window deflector can comprise a first section extending upward into the window frame and a second section extending below the window frame, wherein the first section is integral with the second section. In some embodiments, the mounting clip can be retained within said window channel and can comprise a first portion which engages both the exterior and interior sides of the window channel and a second portion which grips a portion of the first section of the window deflector.

In some embodiments, the portion of the first section of the window deflector can define a recess which receives the inner stem of the mounting clip. In some embodiments, a thickness of the recess is substantially equal to a thickness of the inner stem so that a face of the inner stem and a surface of the first section of the window deflector adjacent to the recess are flush. In some embodiments, the thickness of the recess can be within 10% of the thickness of the inner stem. In some embodiments, the top portion of the mounting clip is curved downwardly toward a first end and curved downwardly toward a second end. In some embodiments, the first and second ends of the first portion of the mounting clip comprise at least one engagement portion which engages the interior and exterior sides of the window channel. The at least one engagement portion can extend outward beyond an end of at least one protrusion on the interior and exterior sides of the window channel and can engage the at least one protrusion, wherein the at least one protrusion is angled such that a contacting surface of the at least one protrusion lays adjacent to a contacting surface of the at least one engagement portion.

Disclosed herein is a method of installing a window deflector in a window frame of vehicle. The method can comprise: inserting a mounting clip into the window frame and securing a first portion of the mounting clip to both an interior side and an exterior side of a window channel positioned within the window frame; and inserting a first section of the window deflector into a second portion of the mounting clip, the second portion of the mounting clip configured to grip the first section of the window deflector within the window frame. The step of inserting the first section of the window deflector into the second portion of the mounting clip can be carried out before the step of inserting the mounting clip into the window frame. In some embodiments, the first portion of the mounting clip comprises a first end and a second end, and wherein the first portion is curved downwardly from the first end to the second end. In some embodiments, the second portion of the mounting clip is configured to grip the first section of the window deflector on both sides.

BRIEF DESCRIPTION OF THE DRAWINGS

FIG. 3A illustrates a perspective view of a window deflector of the window deflector assembly of FIG. 2A.

FIG. 3E illustrates a top view of the window deflector of FIG. 3A.

FIG. 3F illustrates a bottom view of the window deflector of FIG. 3A.

FIG. 3I illustrates another side view of the window deflector of FIG. 3A.

FIG. 3J illustrates another side view of the window deflector of FIG. 3A.

DETAILED DESCRIPTION

Disclosed herein are embodiments of a window deflector assembly which can be installed within a window channel of a window frame of a vehicle. The window deflector assembly can include a window deflector and a mounting clip. The mounting clip can include structure that allows the clip to engage both sides of a window channel and also secure a portion of the window deflector. Such engagement of both sides of a window channel affords the window deflector assembly the ability to withstand greater loads caused by, for example, wind or other forces and/or relative movement of the assembly within the window frame. As discussed further herein, the mounting clip can include structure, which can sandwich and/or grip a portion of the window deflector, thus allowing the mounting clip (or mounting clips) to be installed on the window deflector prior to securement of the mounting clip to the window channel of the vehicle. This provides an alternative installation method for the window deflector assembly that can be more convenient in some situations. The portion of the mounting clip configured to engage both sides of the window channel can have a curved (for example, arched) structure which can allow for convenient installation and can provide greater load distribution of vertical load arising from the window deflector to sides of the window channel. Further, as discussed more below, a portion of the window deflector secured by the mounting clip can define a recess sized to receive a portion of the mounting clip that grips the window deflector. This can provide a flush interface between the window deflector and the mounting clip at the connection region (also referred to herein as a "securement region"), which can allow a window (e.g., glass window) to pass adjacent to the interface without being contacted. Advantageously, the mounting clips discussed herein can secure window deflectors inside window frames of a vehicle without requiring the use of adhesives, such as tapes.

Figure 1A:
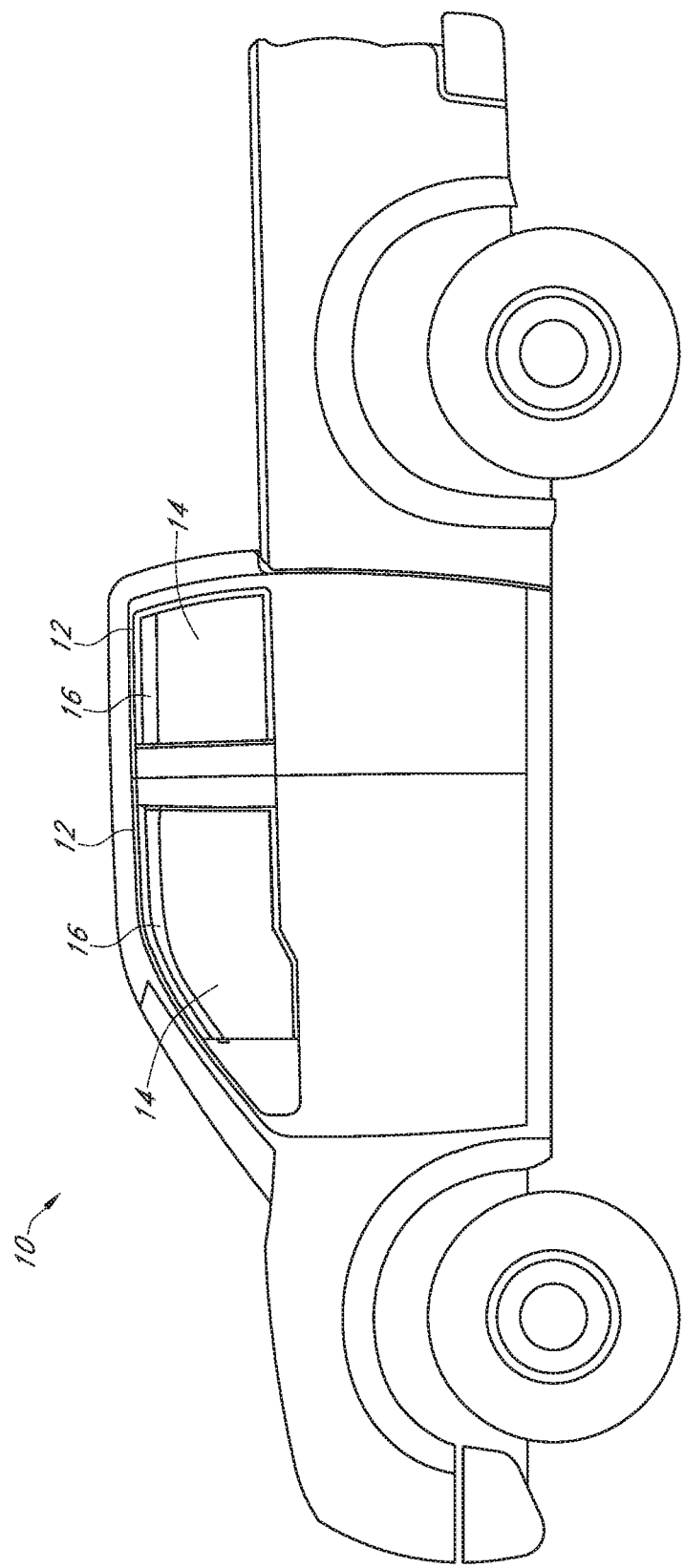
FIG. 1A illustrates a side view of a vehicle with two side window deflectors installed.
Figure 1B:
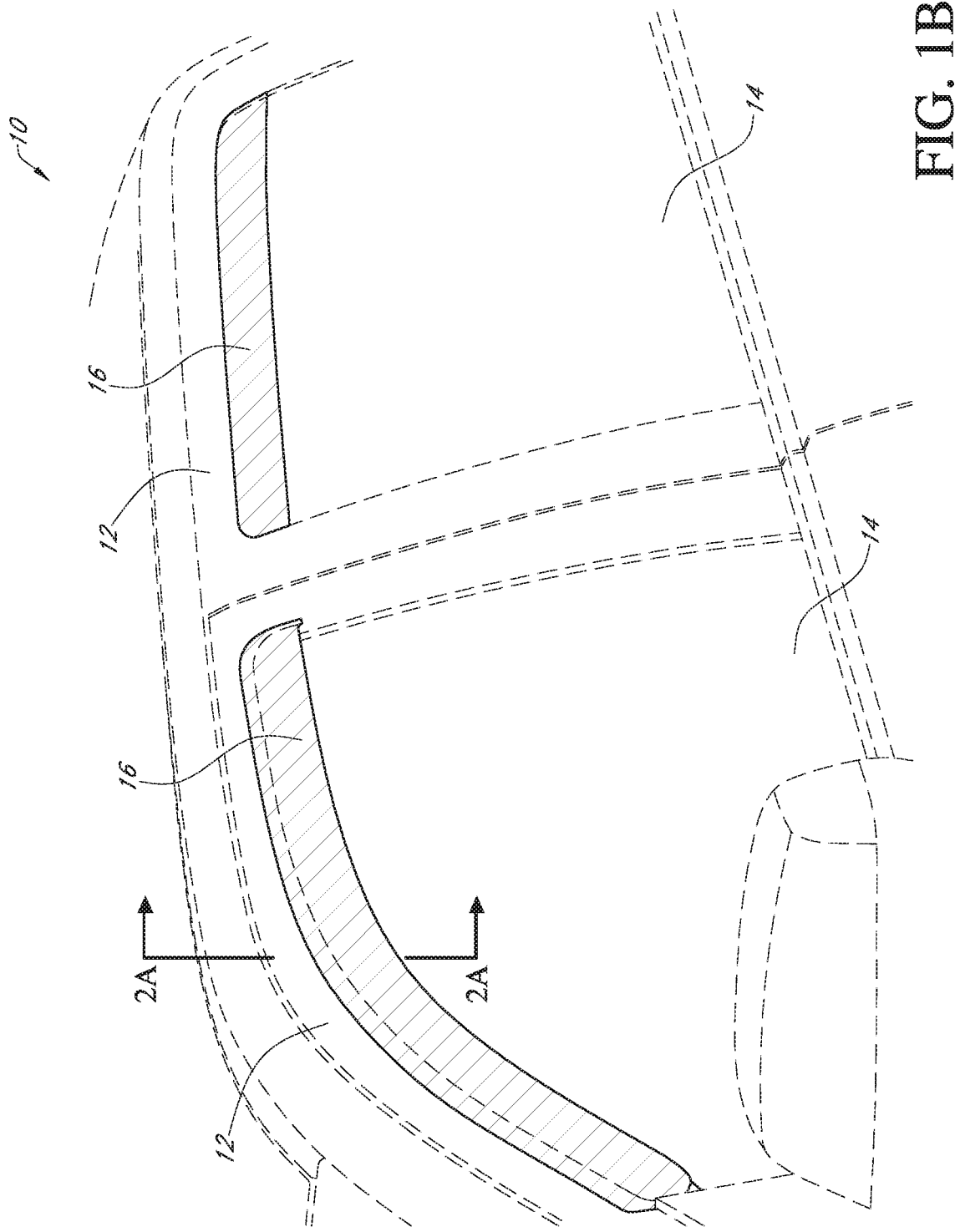
FIG. 1B illustrates an enlarged perspective view of the installed side window deflectors of FIG. 1A.

FIG. 1A illustrates a side view of a vehicle 10 with window deflectors 16 installed proximate two windows 14 of the vehicle. More precisely, when installed, a portion of the window deflector 16 can be installed within a window channel 18 of a window frame 12 of a vehicle 10 (see, e.g., FIG. 2A-2B). FIG. 1B shows an enlarged perspective view of the window deflectors 16 when installed.

Figure 2A:
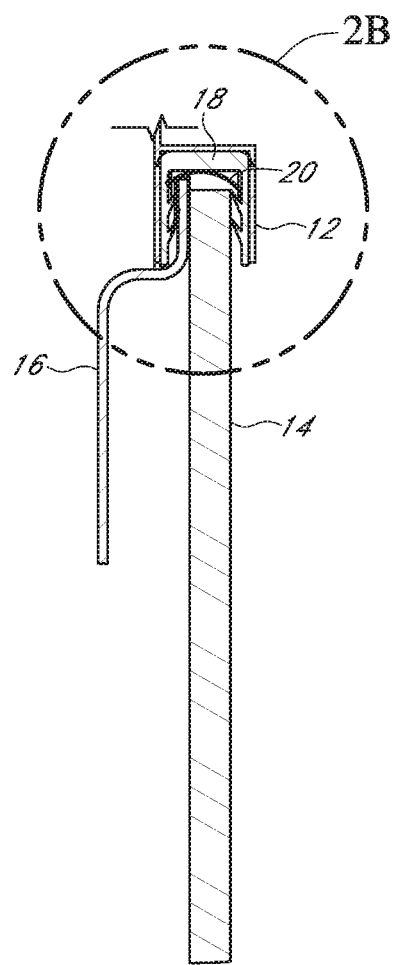
FIG. 2A illustrates a cross-section of a window deflector assembly installed within the window frame of the vehicle of FIG. 1B.
Figure 2B:
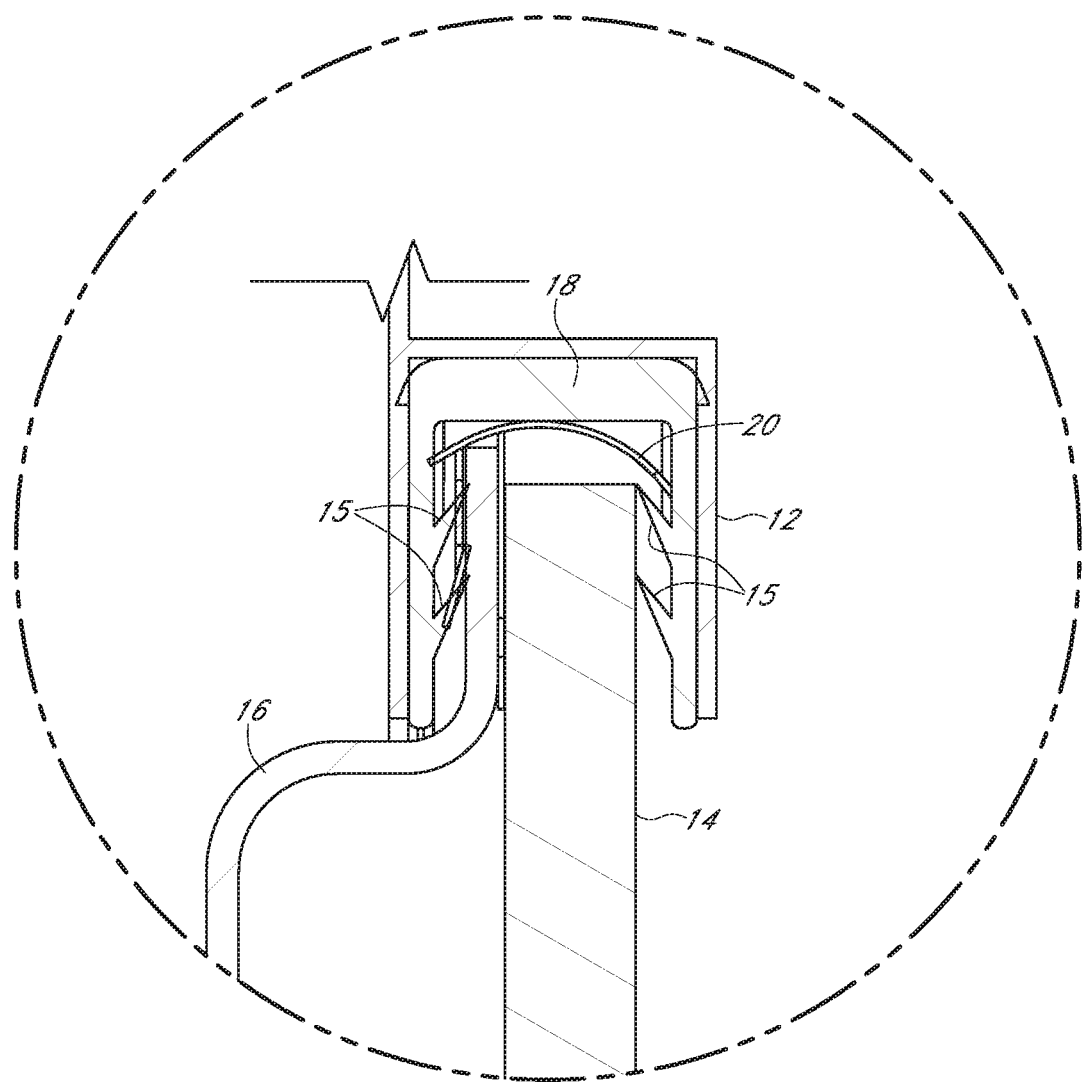
FIG. 2B illustrates an enlarged view of the window deflector assembly of FIG. 2A.
Figure 2C:
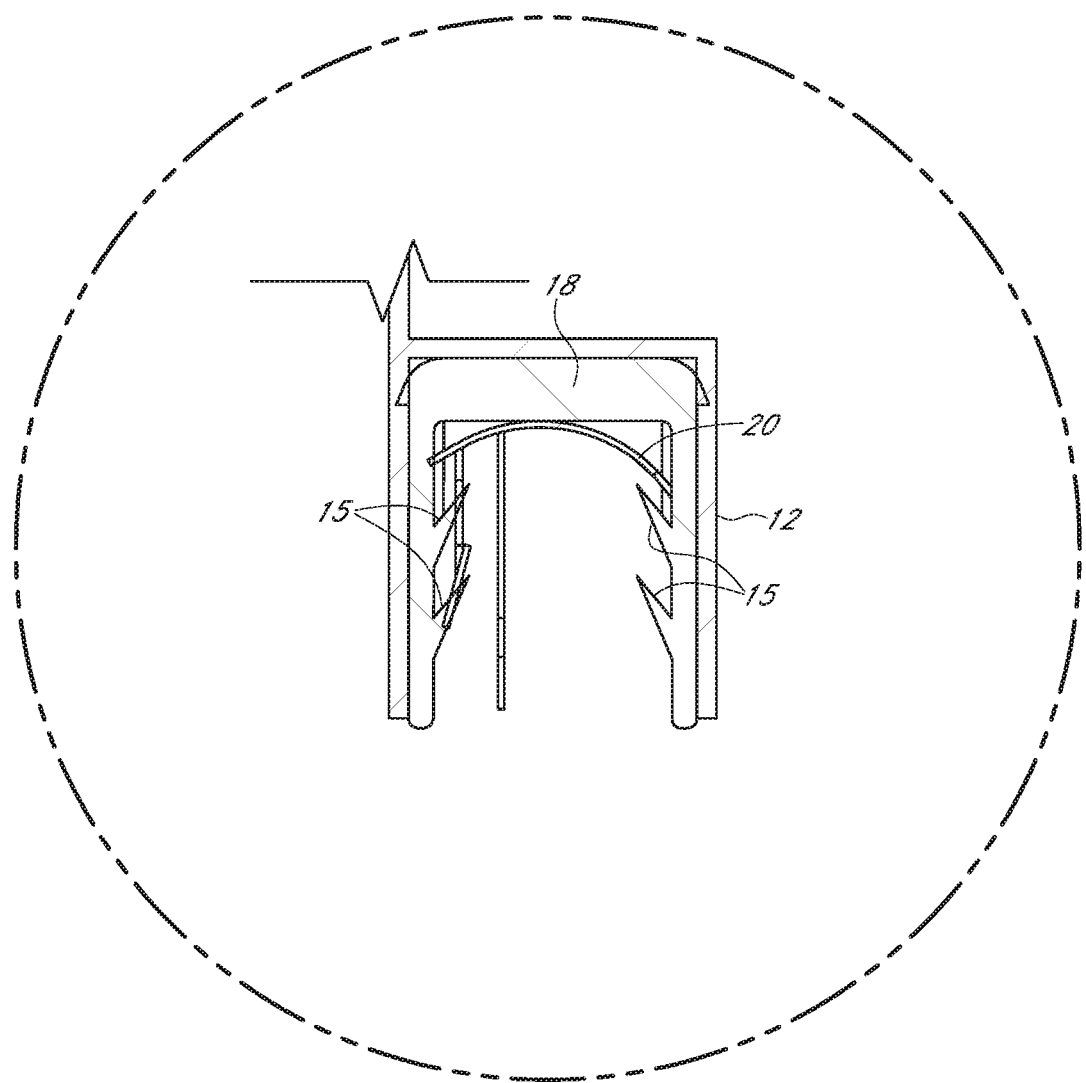
FIG. 2C illustrates an enlarged view of the window frame of the vehicle of FIG. 1B.

FIG. 2A-2B illustrate a cross-section of a window deflector 16 installed within a window channel 18 of a window frame 12 with a mounting clip 20, where window 14 is in a closed position. As can be seen, window channel 18 is located within window frame 12 and includes two sides, one closer to an interior of the vehicle than the other. Window channel 18 can include one or more protrusions, such as one or more flared portions 15. As shown in FIGS. 2A-2C, the one or more flared portions 15 can be vertically spaced along a height of one or both of the sides of the window channel 18. The one or more flared portions 15 can be angled with respect to the sides of the window channel 18. The one or more flared portions 15 can provide a contacting seal against sides of the window 14 when the window 14 is in a closed position (e.g., located at least partially within the window channel 18), while allowing the window 14 to close and open with relative ease. As shown in FIG. 2B, the window channel 18 can include two flared seal portions on each side of the window channel 18, wherein the two flared seal portions 15 are spaced vertically with respect to one another. The window channel 18 can be rubber or another material, and/or can comprise a combination of materials. The flared portions 15 can be continuous and can extend along a portion of a length the window channel 18. Alternatively, the flared portions 15 can be non-continuous (e.g., can be laterally spaced from one another along a portion of the length of the window channel 18). As will be discussed more below, the window channel 18 provides structure that can be engaged by the mounting clips 20 disclosed herein.

As shown in FIGS. 2A-2B, when the window deflector 16 is installed, a portion of the window deflector 16 can extend upward into (and/or be positioned within) the window frame 12 and another portion of the window deflector 16 can extend below (and/or be positioned outside) the window frame 12 and/or outward away from the window 14 of the vehicle 10. Such configuration of the window deflector 16 can reduce interior wind noise. The mounting clip 20 can extend across a gap between the sides of the window channel 18 and window frame 12 and can engage both sides of the window channel 18. Additionally or alternatively, the mounting clip 20 can engage the flared portion 15 on one or both sides of the window channel 18. The structure and characteristics of the mounting clip 20 are discussed further below.

As can be seen in FIGS. 2A-2B, the portion of the window deflector 16 extending upward into the window frame 12 can be secured by a portion of the mounting clip 20. For example, as shown, a portion of the window deflector 16 can be gripped by two stems of the mounting clip 20 on both sides of the window deflector 16. The two stems of the mounting clip 20 can be inset or spaced inwardly from ends of the mounting clip 20 to accommodate the structure and/or configuration of the window channel 18 and/or window frame 12 (for example, the flared portions 15 of window channel 18). The two stems of the mounting clip 20 can be positioned closer to one end of the mounting clip 20 than the other, which can provide a gap to accommodate movement of the window 14 within the window channel 18 and/or window frame 12 when the mounting clip 20 and/or the window deflector 16 is installed within the window channel 18.

Such structure and configuration of the two stems of the mounting clip 20 advantageously avoids interfering with opening and closing of the window 14 within the window frame 12, and problems associated with such interference. As discussed above, installation and/or securement of typical window deflectors and/or attachment devices utilize tapes to secure the attachment devices to the window channel 18 and/or window frame 12. For example, double-sided adhesive tapes are typically secured to a portion of the window channel 18 and/or window frame 12 and a surface of the attachment device, and portions of the window deflector are often wedged in between a portion of the attachment device and the window channel 18 and/or window frame 12. In such configurations, portions of these attachment devices (such as flanges which "wedge" the window deflector 16 against the window channel 18) may sometimes stick out and bump against or otherwise interfere with a portion of the window 14 when the window 14 is being closed. Many windows and vehicle window systems include so called "anti-pinch" features that prevent closing of the window 14 if an obstacle or interference is sensed when the window 14 is being closed. Thus, there is a risk that window deflector attachment devices will trigger such "anti-pinch" features and thus prevent users from closing vehicle windows. This risk is of greater concern in rainy conditions where water should be kept from getting into an interior of the vehicle. Advantageously, the structure and configuration of the mounting clip 20 can avoid such problem by providing an appropriate gap and/or spacing which allows movement of the window 14 within the window frame 12, while also allowing the window deflector 14 to be secured between the two stems proximate to the window 14 when in the closed position. Additionally, because the mounting clip 20 can secure the window deflector 16 without relying on "wedging" the window deflector 16 against the window channel 18, portions of mounting clip 20 that secure the window deflector 16 are not likely to be pushed outward so as to bump against or otherwise interfere with the window 14 when the window 14 is being closed (thus avoiding activation of "anti-pinch" features common in many automatic vehicle window systems).

FIG. 2C illustrates a cross-section of the window frame 12 including the window channel 18 and a mounting clip 20, without also showing the window deflector 16 and the window 14.

FIGS. 3A-3J illustrate various views of the window deflector 16. Window deflector 16 can include a first section 36 configured to extend upward into (and/or be positioned within) the window frame 12 when installed and a second section 34 configured to extend below (and/or be positioned outside) the window frame 12 and/or outward from the window frame 12 when installed. The first section 36 and the second section 34 can be integral. Alternatively, the first section 36 and the second section 34 can be non-integral. The first section 36 can be inserted into the window frame 12 and/or window channel 18 at a top end 30 and/or along sides of the window deflector 16 between the top end 30 and a bottom end 32. As shown, the second section 34 can protrude outward from the first section 36. In some embodiments, the first section 36 defines a rim extending along one or more sides of the window deflector 16 and/or around the second section 34. As discussed and shown herein, the window deflector 16 can be secured to the one or more mounting clips 20 at one or more securement regions. For example, the window deflector 16 can be secured to one or more mounting clips 20 at one or more securement regions along the first section 36, such as one, two, three, four, five, six, seven, eight, nine, or ten or more securement regions along the first section 36. The spacing between the one or more securement regions can be equal or unequal, depending on the configuration of the assembly of the window deflector 16 and the one or more mounting clips 20.

Figure 3B:
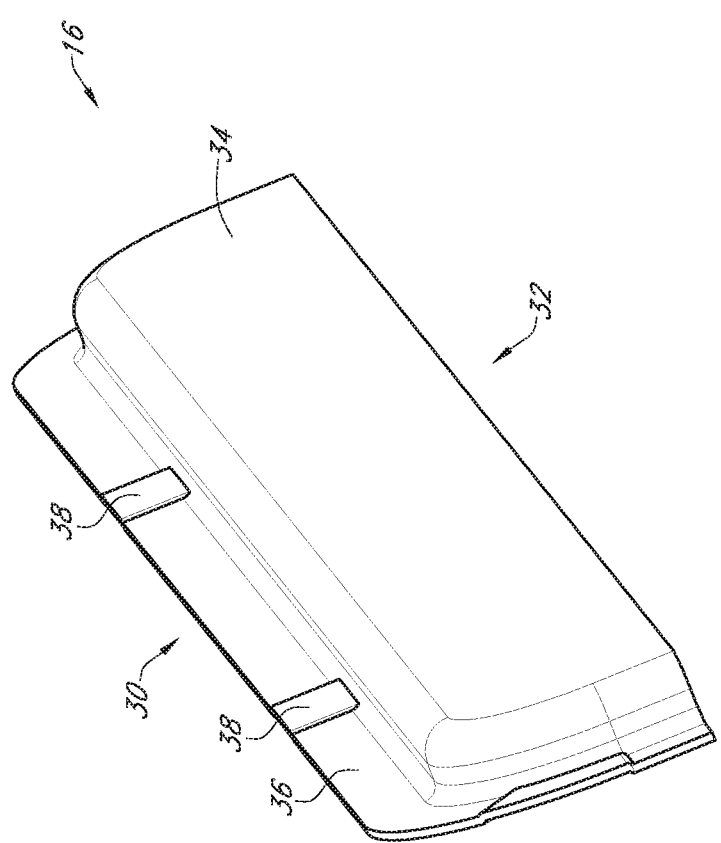
FIG. 3B illustrates another perspective view of the window deflector of FIG. 3A.
Figure 3C:
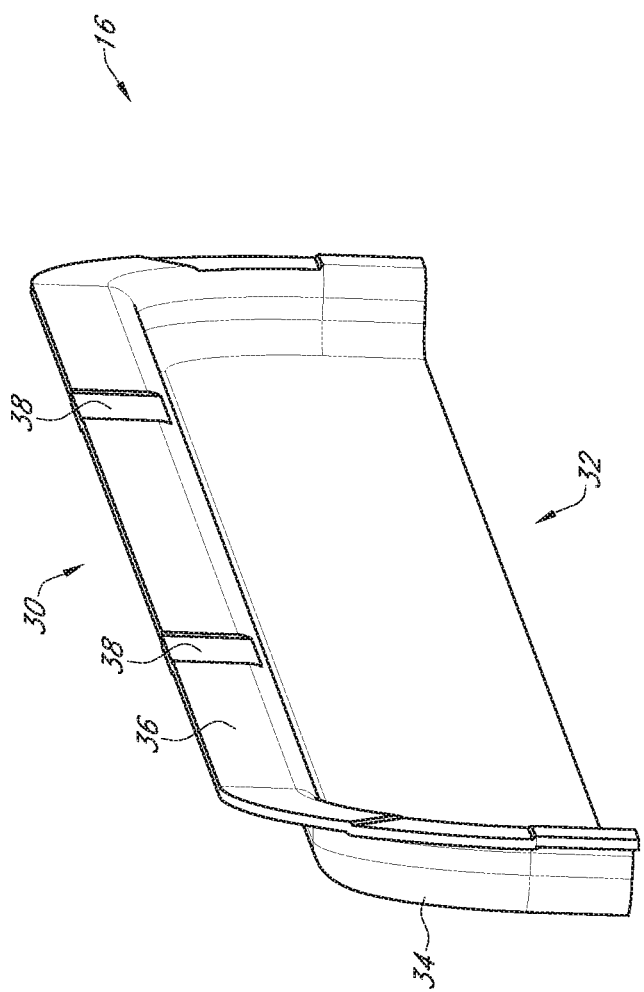
FIG. 3C illustrates another perspective view of the window deflector of FIG. 3A.
Figure 3D:
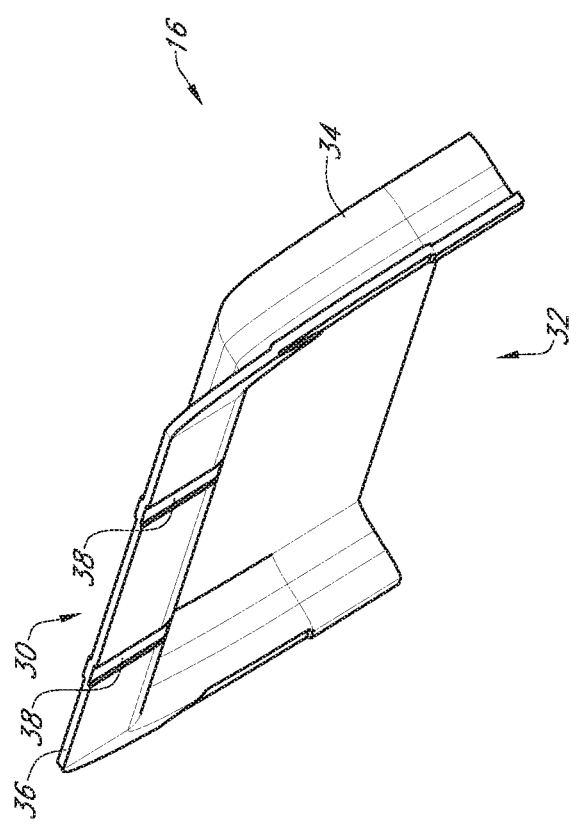
FIG. 3D illustrates another perspective view of the window deflector of FIG. 3A.
Figure 3G:
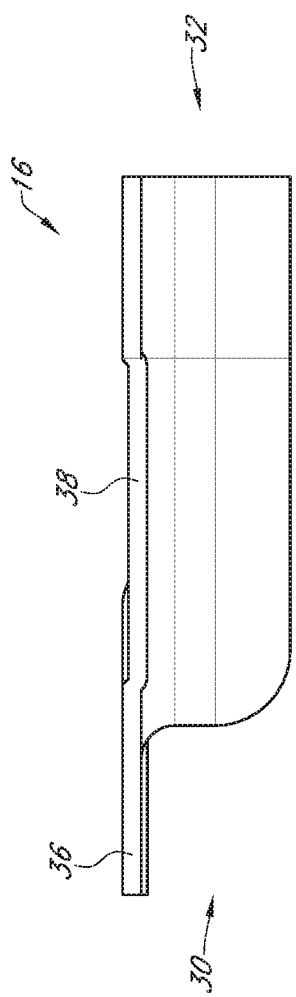
FIG. 3G illustrates a side view of the window deflector of FIG. 3A.
Figure 3H:
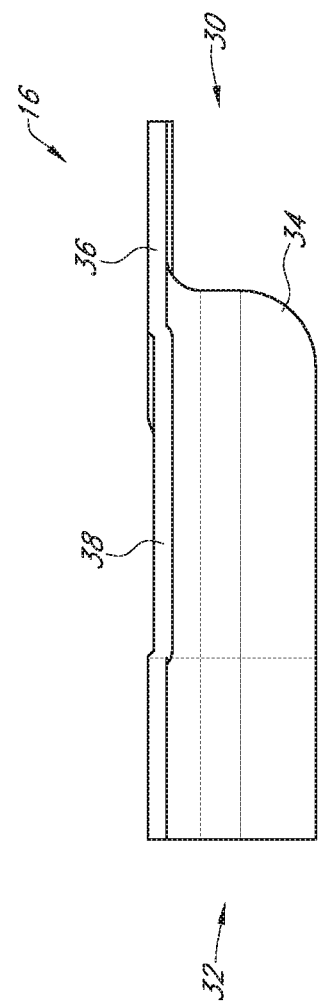
FIG. 3H illustrates another side view of the window deflector of FIG. 3A.
Figure 4A:
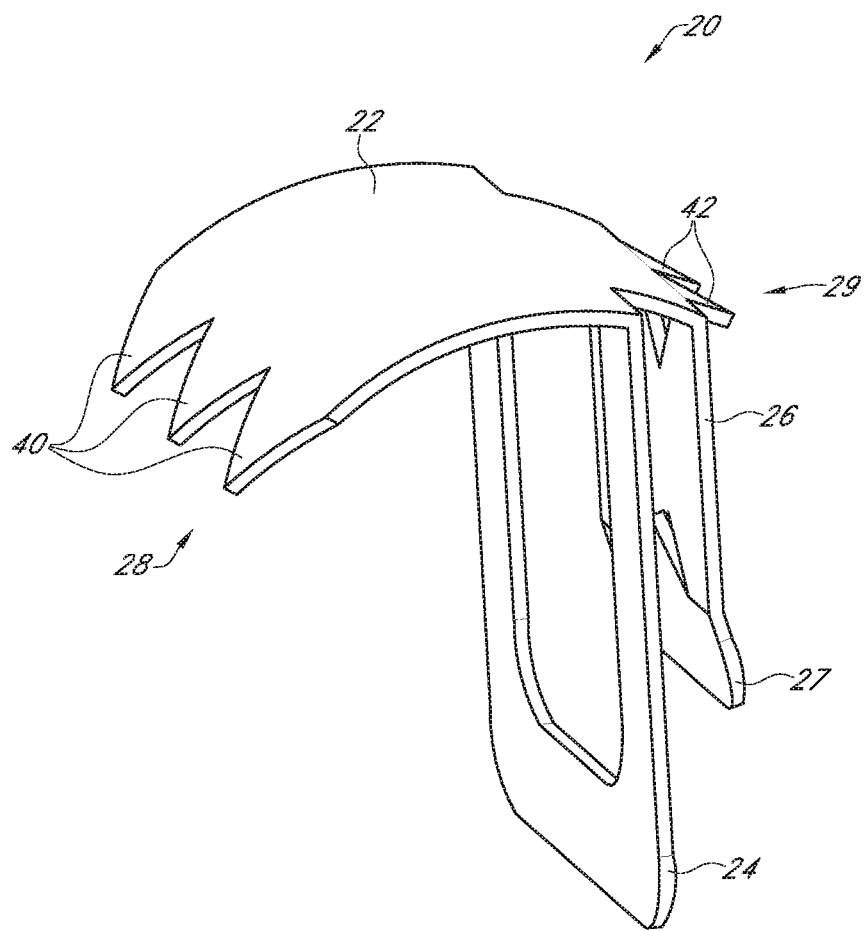
FIG. 4A illustrates a perspective view of a mounting clip of the window deflector assembly of FIG. 2A.
Figure 4B:
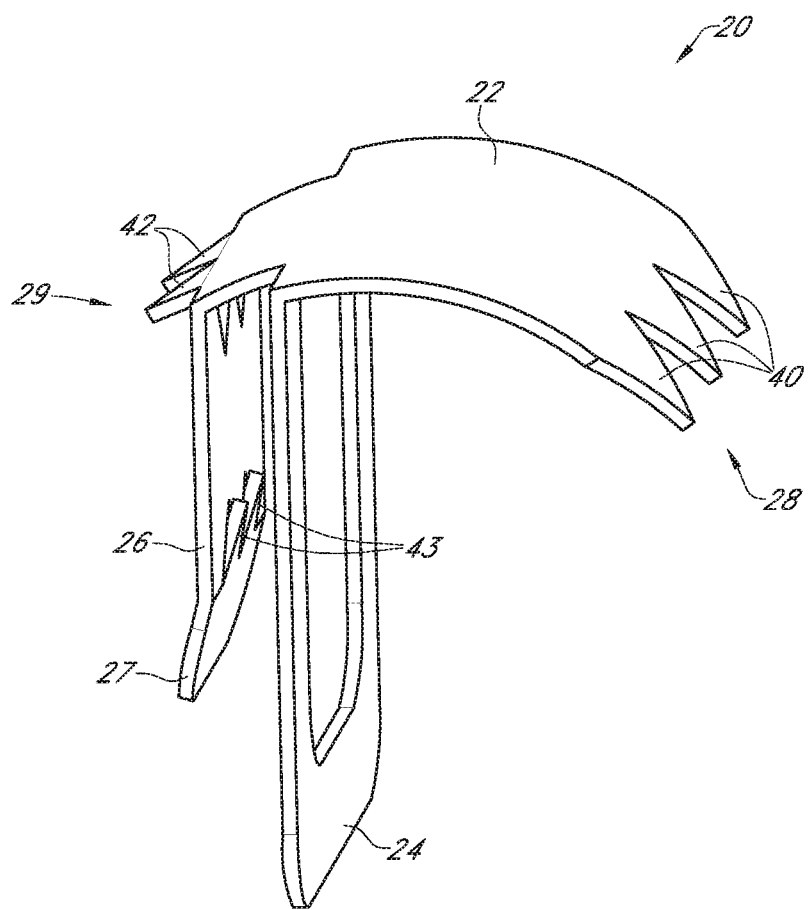
FIG. 4B illustrates another perspective view of a mounting clip of FIG. 4A.
Figure 4C:
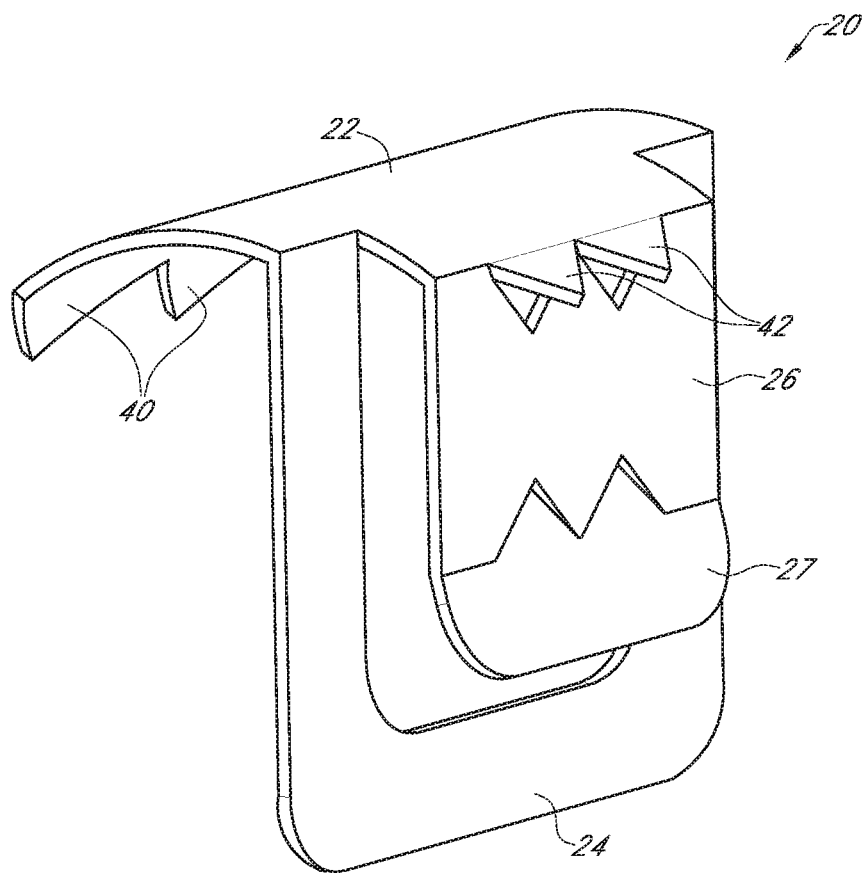
FIG. 4C illustrates another perspective view of the mounting clip of FIG. 4A.

Each of the one or more securement regions can define a recess 38. Recess 38 can be sized to receive an inner stem 24 of the mounting clip 20 (see, e.g., FIG. 4B). Attention is directed to FIGS. 3C, 4B, and 2B. As discussed herein, when the mounting clip 20 is installed within the window channel 18 and a portion of the window deflector 16 (for example, the first section 36) is secured between the inner stem 24 and the outer stem 26 of the mounting clip 20, the inner stem 24 can be positioned between the window deflector 16 and the window 14. In some cases, when the window 14 is in a closed or partially closed position, there may be little or nor gap between the window 14 and the inner stem 24 which may result from the dimensional properties of any of these interacting components or may be a result of natural expansion of the components or materials thereof (e.g., thermal expansion). The minimal or non-existent gap between the window 14 and the inner stem 24 may result in contact between the window 14 and the inner stem 24. Advantageously, the one or more securement regions of the window deflector 16 secured by the one or more mounting clips 20 can be recessed to receive the inner stem 24 within recess 38 so that the inner stem 24 does not protrude outward passed a face of the window deflector 16, and/or protrude outward passed a face of the window deflector 16 beyond a certain distance. Thus, regardless of the existence or size of the gap between the window 14 and the inner stem 24 when the window 14 is in a closed or partially closed position, the window 14 can contact a face of the window deflector 16 (for example, a face of the first section 36) without also contacting the inner stem 24. Thus, the recess(es) 38 can reduce forces and/or contact between the window 14 and the inner stem 24. Recess(es) 38 can have a thickness (also referred to herein as "depth") that is greater than, less than, or substantially equal to a thickness of the inner stem 24. For example, the thickness of the recess(es) 38 can be greater than the thickness of the inner stem 24 by no more than 30%, 20%, 10%, 8%, 5%, 2%, or 1%, or any value therebetween, or any range bounded by any combination of these values, although values outside these ranges can be used in some cases. As another example, the thickness of the recess(es) 38 can be a percentage of the thickness of the inner stem 24, such as 70%, 75%, 80%, 85%, 90%, 95%, 100%, 105%, 110%, 115%, 120%, 125%, 130%, or any value therebetween, or any range bounded by these values. Where the thickness of the recess(es) 38 and the inner stem 24 are substantially equal, a surface of the window deflector 16 proximate to the recess(es) 38 and a face of the inner stem 24 (e.g., one that faces the window 14 when the window 14 is in a closed position) can be flush (e.g., coplanar), which can prevent bumps and/or exposed edges in the interface between the window 14 and inner stem 24 and/or window deflector 16 when the window 14 is in the closed position or is moving to or from such position. In some cases, however, it may be advantageous to provide a recess 38 with a thickness greater than a thickness of the inner stem 24 by 10% or more than 10% (such as 20% or 30%) depending on the materials used for the window deflector 16 and/or inner stem 24. For example, if the inner stem 24 is made of a material that may expand more than a material of the window deflector 16, the thickness of the window deflector 16 may be selected to be, for example, 5% greater, 10% greater, 15% greater, 20% greater, 25% greater, 30% greater, or 40% greater than the thickness of the inner stem 24. This can ensure that if the inner stem 24 expands and/or warps differently than the window deflector 16 (or a portion thereof proximate to the securement region), the inner stem 24 does not protrude outward passed a face or edge of the recess 38 and contact the window 14.

FIGS. 4A-4H illustrate various views of the mounting clip 20. As shown, the mounting clip 20 can include a top portion 22 configured to secure to and/or within the window channel 18. For example, the top portion 22 can secure to one or both sides of the window channel 18. The top portion 22 can include a first end 29 configured to engage a first side of the window channel 18 (for example, a side of the window channel 18 that is closer to an interior of a vehicle 10) and a second end 28 configured to engage a second side of the window channel 18 (for example, a side of the window channel 18 that is closer to an exterior of the vehicle 10 and opposite the side that is closer to the interior of the vehicle 10). The first and second ends 29, 28 of the top portion 22 can engage the first and second sides of the window channel 18 by pressing and/or butting against the sides and/or sticking within a portion of the sides, for example (see, e.g., FIG. 2B). Additionally or alternatively, the first and second ends 29, 28 of the top portion 22 can engage the first and second sides of the window channel 18 by extending beyond an end or tip of the flared portions 15 of the window channel 18. Additionally or alternatively, the first and second ends of the top portion 22 can rest atop and/or within the flared portion(s) 15 of the window channel 18. As further discussed below, the top portion 22 of the mounting clip 20 can be curved downwardly toward the first end 29 and/or curved downwardly toward the second end 28. Where the flared portion(s) 15 are angled upward towards a top of the window frame 12 (see FIG. 2B), the downwardly curved first and second ends 29, 28 of the top portion 22 can engage the angled flared portion(s) 15 so that a contacting surface of the first and second ends of the top portion 22 lays adjacent to a contacting surface of the angled flared portion(s) 15. Such engagement may occur when, for example, vertical load is applied to the top portion 22 of the mounting clip 20 in a downward direction from the weight of the window deflector 16, thus pulling the top portion 22 downward so that the first and second ends 29, 28 fall into a space defined between the angled flared portion(s) 15 and the sides of the window channel 18.

As discussed herein, the top portion 22 of the mounting clip 20 can have a curved structure which can allow for convenient installation and can provide greater and more efficient load distribution of vertical load (e.g., arising from the weight of the window deflector 16 when secured to the mounting clip 20) to sides of the window channel 18. As mentioned above, the top portion 22 of the mounting clip 20 can be curved downwardly toward the first end 29 and curved downwardly toward the second end 28. This structure and curvature can allow the mounting clip 20 to be inserted upward into the window channel 18 and passed the flared portion(s) 15 of the window channel 18 with relative ease, while also allowing first and second ends 29, 28 of the top portion 20 to engage one or both sides of the window channel 18 when in an installed position. The curvature of the top portion 20 can also help provide efficient load distribution. For example, where the window deflector 16 is secured by inner stem 24 and outer stem 26 of the mounting clip 20, downward vertical load is applied to the top portion 22 of the mounting clip 20. The curvature of the top portion 22, which can be arch-shaped, can efficiently distribute such vertical load to sides of the window channel 18. This curvature and efficient load distribution allows the mounting clip 20 to carry and transfer greater vertical loads resulting from the window deflector 16 and reduces the likelihood that the window deflector 16 will dislodge from the window channel 18, especially at high vehicle speeds and/or when wind or other forces or conditions are present.

The mounting clip 20 can include one or more engagement portions configured to engage one or both sides of window channel 18, such as at least one, at least two, at least three, at least four, at least five or at least six engagement portions. For example, with reference to FIGS. 4A-4H, the mounting clip 20 can include one or more engagement portions 40, 42 on the top portion 22 configured to engage one or both sides of the window channel 18. As shown in at least FIGS. 4A and 4B, the top portion 22 can include one or more engagement portions 42 at or proximate to the first end 29 of the top portion 22 and/or can include one or more engagement portions 40 at or proximate to the second end 28 of the top portion 22. The one or more engagement portions 40, 42 can be laterally spaced from one another along the first and/or second ends of the top portion 22. The one or more engagement portions 40, 42 can be equally or un-equally spaced from one another along the first and/or second ends 29, 28 of the top portion 22. The one or more engagement portions 40, 42 can be tapered from sides of the engagement portions 40, 42 to form a pointed tip when viewed from above (see FIG. 4E) which can assist the top portion 22 to better engage one or both sides of the window channel 18. For example, the pointed tip can help the one or more engagement portions 40, 42 to press and/or dig into one or both sides of the window channel 18. As discussed above, one or both of the first and second ends 29, 28 of the top portion 22 can be curved downwardly and can engage angled flared portion(s) 15 of the window channel 18. As also discussed above, one or both of the first and second ends of the top portion 22 can be curved downwardly and can engage angled flared portion(s) 15 of the window channel 18 such that a contacting surface of the first and second ends 29, 28 of the top portion 22 lays adjacent to a contacting surface of the angled flared portion(s) 15. In such cases, where the first and second ends 29, 28 of the top portion 22 include one or more engagement portions 40, 42, the one or more engagement portions 40, 42 can have contacting surfaces that lay adjacent to contacting surfaces of the angled flared portion(s) 15. This can advantageously provide robust securement in addition or as an alternative to having the first and second ends 29, 28 of the top portion 22 press against one or both of the sides of the window channel 18.

As shown in at least FIGS. 4A-4D, the mounting clip 20 can include an outer stem 26 and an inner stem 24. The outer stem 26 can be at or proximate to the first end 29 of the top portion 22. The inner stem 24 can be spaced from the outer stem 26 so as to allow a portion of the window deflector 16 (such as a portion of the first section 36 of window deflector 16) to be received therewithin. The spacing between the inner stem 24 and the outer stem 26 can be sized to allow the inner and outer stems 24, 26 grip the portion of the window deflector 16 so as to secure (e.g., hold) it in position within the mounting clip 20. The inner and outer stems 24, 26 can grip the portion of the window deflector 16 on both sides, thus providing robust securement and significantly reducing the likelihood that the window deflector 16 will dislodge from the window channel 18, especially at high vehicle speeds and/or when wind or other forces or conditions are present. As discussed above, the inner stem 24 can be retained within a recess 38 of the window deflector 16, which can provide the advantages discussed above.

As shown in FIG. 4B, the mounting clip 20 can include one or more engagement portions 43 that can extend inwardly (e.g., toward inner stem 24) from a face of the outer stem 26. These engagement portions 43 can extend toward a portion of the window deflector 16 that is retained between the inner and outer stems 24, 26 and can press and/or butt against the portion of the window deflector 16 when installed. The engagement portions 43 can be the same in some, many or all respects as engagement portions 40, 42. For example, the engagement portions 43 can be laterally spaced from one another along the face of the outer stem 26. The engagement portions 43 can be equally or un-equally spaced from one another along the face of the outer stem 26. The engagement portions 43 can have a pointed tip (see, e.g., FIG. 4B) which can assist the outer stem 26 to better engage a face of the window deflector 16. The one or more engagement portions 43 can be angled upwards, for example, which can allow a portion of the window deflector 16 to be inserted between the inner and outer stems 24, 26 with relative ease while advantageously also making removal of the portion of the window deflector 16 more difficult. This configuration of the engagement portions 43 thus can reduce the likelihood of unintended dislodgement of the window deflector 16 from the mounting clip 20. While not shown in the figures, the inner stem 24 can also have one or more engagement portions extending inwardly from a face of the inner stem 24 (e.g., towards outer stem 26), which can be the same in some or all respects as engagement portions 43.

As can be seen in FIG. 4B among other figures, the outer stem 26 can have a cantilevered end 27 that can be flared. For example, the cantilevered end 27 of the outer stem 26 can be flared outward and configured to engage a portion of a side of the window channel 18 when the mounting clip 20 is installed within the window frame 12. As shown in FIGS. 2A-2B, the flared cantilevered end 27 can engage a side of the window channel 18 by pressing and/or butting against the side and/or sticking within a portion of the side, for example. Additionally or alternatively, the flared cantilevered end 27 can engage a side of the window channel 18 by extending beyond an end or tip of the flared portion(s) 15 of the window channel 18. Additionally or alternatively, the flared cantilevered end 27 can rest atop the flared portion(s) 15 of the window channel 18, and/or can rest within a space defined between the flared portion(s) 15 and the sides of window channel 18. Similar to as that discussed above with respect to the engagement portions 40, 42 of the mounting clip 20, the flared cantilevered end 27 can engage the angled flared portion(s) 15 so that a contacting surface of the flared cantilevered end 27 lays adjacent to a contacting surface of the angled flared portion(s) 15. Such engagement may occur when, for example, vertical load is applied to the top portion 22 of the mounting clip 20 in a downward direction from the weight of the window deflector 16, thus pulling the flared cantilevered end 27 downward so that it falls into the space defined between the angled flared portion(s) 15 and the sides of the window channel 18. The flared cantilevered end 27 can advantageously provide additional securement of the mounting clip 20 to the window channel 18 at a location below the first and/or second ends 29, 28 of the top portion 22 of the mounting clip 20, which can aid in load transfer and balance of the window deflector assembly.

Figure 4D:
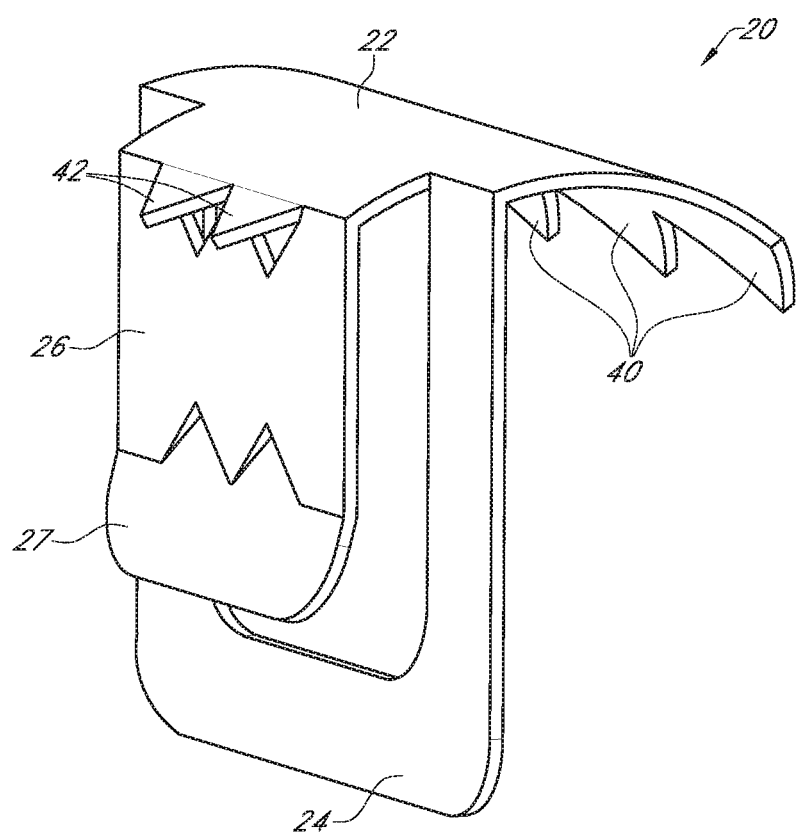
FIG. 4D illustrates another perspective view of the mounting clip of FIG. 4A.
Figure 4E:
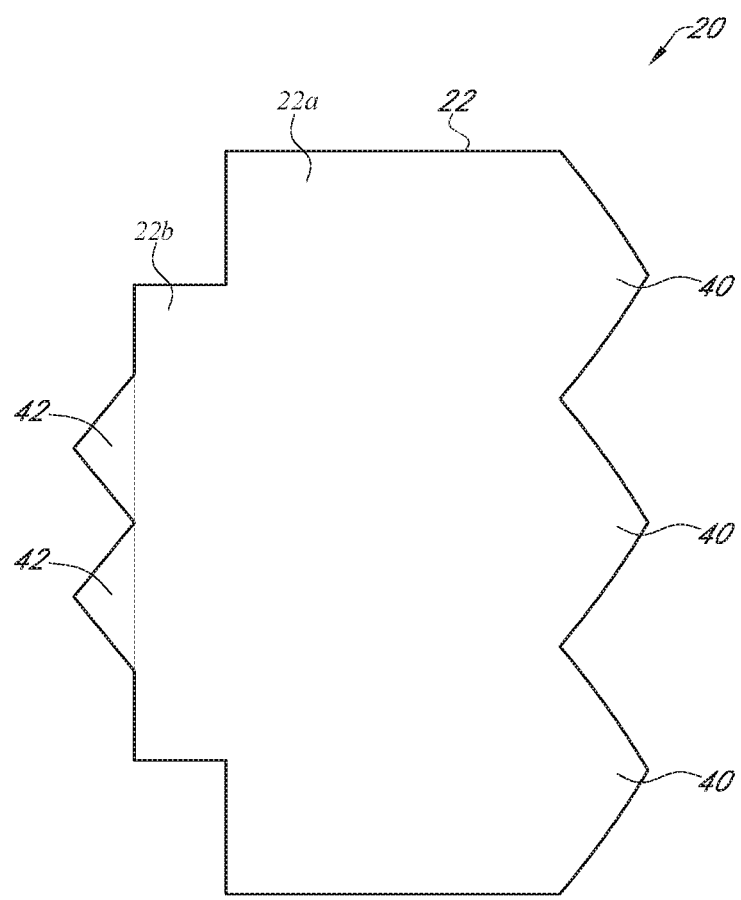
FIG. 4E illustrates a top view of the mounting clip of FIG. 4A.
Figure 4F:
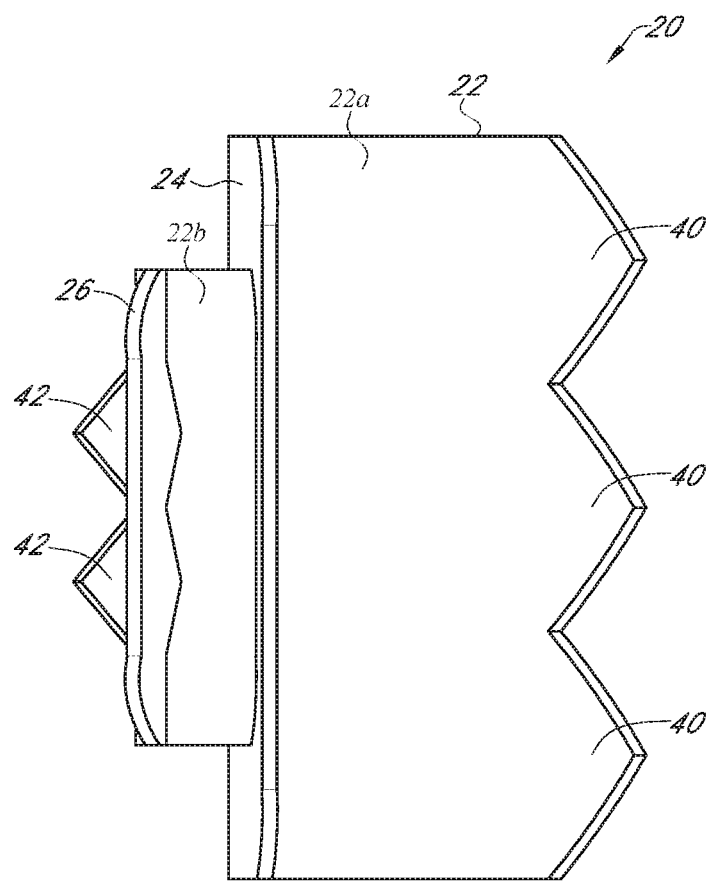
FIG. 4F illustrates a bottom view of the mounting clip of FIG. 4A.
Figure 4G:
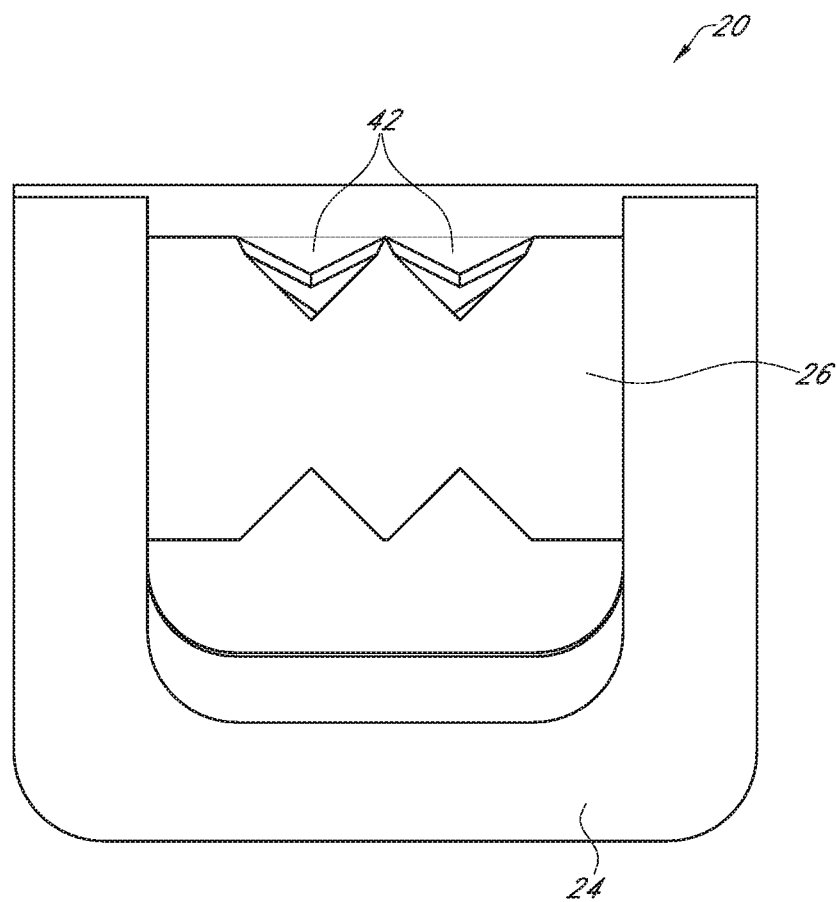
FIG. 4G illustrates a side view of the mounting clip of FIG. 4A.
Figure 4H:
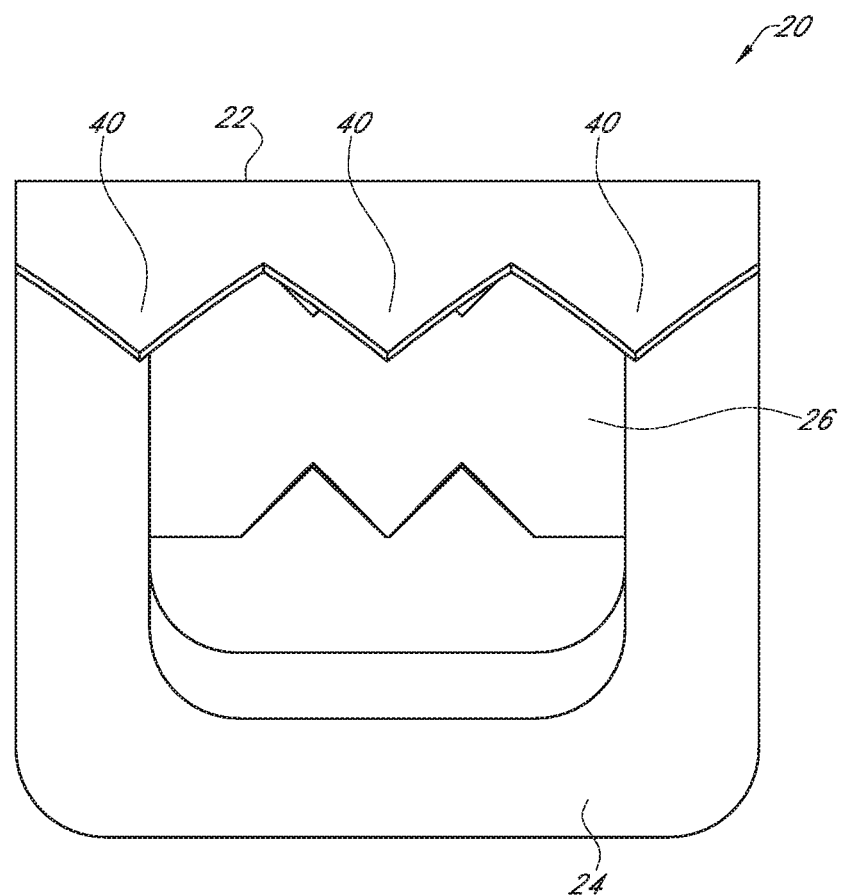
FIG. 4H illustrates another side view of the mounting clip of FIG. 4A.

The top portion 22 of mounting clip 20 can be uniform in cross-section from the first end 29 to the second end 28. Alternatively, the top portion 22 can be non-uniform in cross-section from the first end 29 to the second end 28. For example, as best illustrated in the top view of the mounting clip 20 from FIG. 4E, the top portion 22 can have a body 22a and a tail 22b that is narrower than body 22a. As shown in FIG. 4E, the tail 22b can have a length and/or width that is smaller than a length and/or width of the body 22a. As shown by FIG. 4D, the shape and structure of the body 22a and tail 22b of the top portion 22 as well as the shape and structure of the inner and outer stems 24, 26 allows the various elements to be constructed from a single piece of material during manufacturing. For example, as shown in at least FIG. 4D, a single flat piece of material can be bent to form the body 22a of the top portion 22 and the tail 22b and outer stem 26 can be cut from the part of the piece of material defining the inner stem 24. This in turn can leave an opening in the inner stem 24, as shown.

Figure 5A:
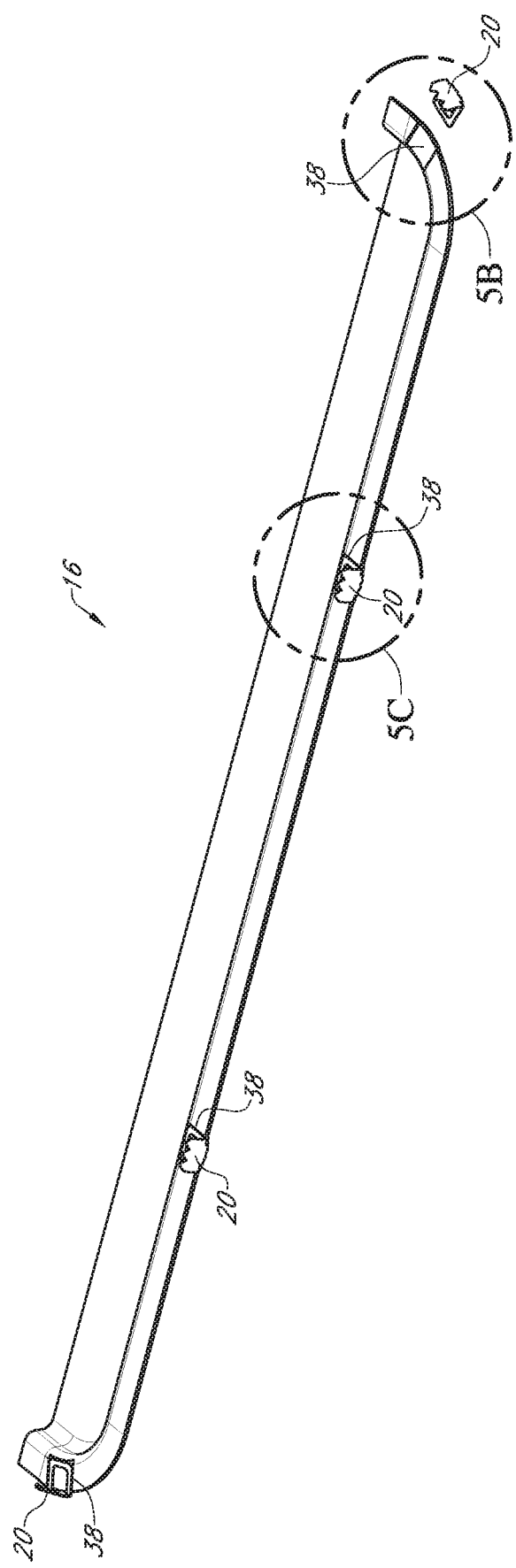
FIG. 5A illustrates a window deflector assembly including a window deflector and mounting clips.
Figure 5B:
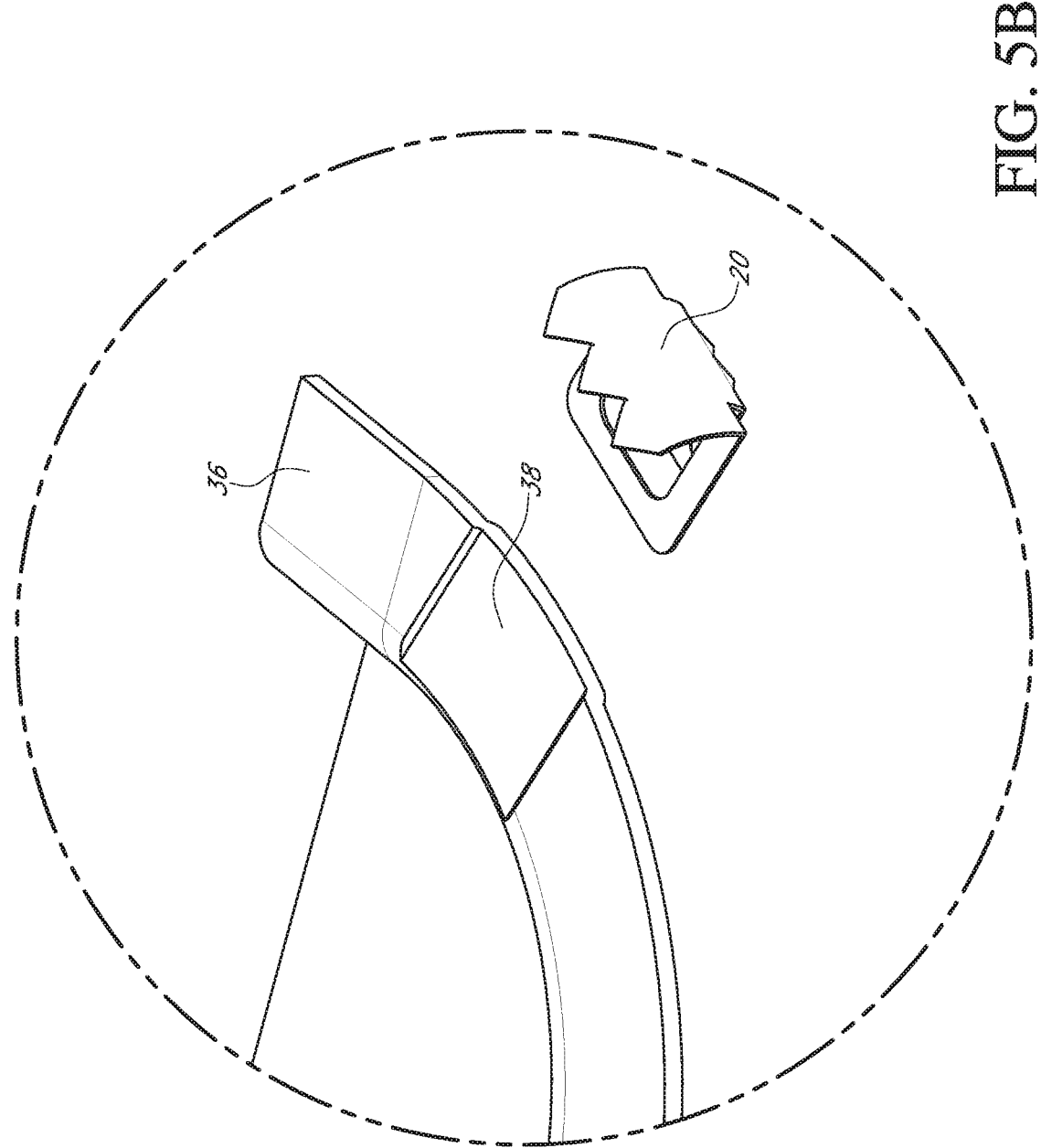
FIG. 5B illustrates an enlarged perspective view of the window deflector assembly of FIG. 5A, including a window deflector and a mounting clip detached from the window deflector.
Figure 5C:
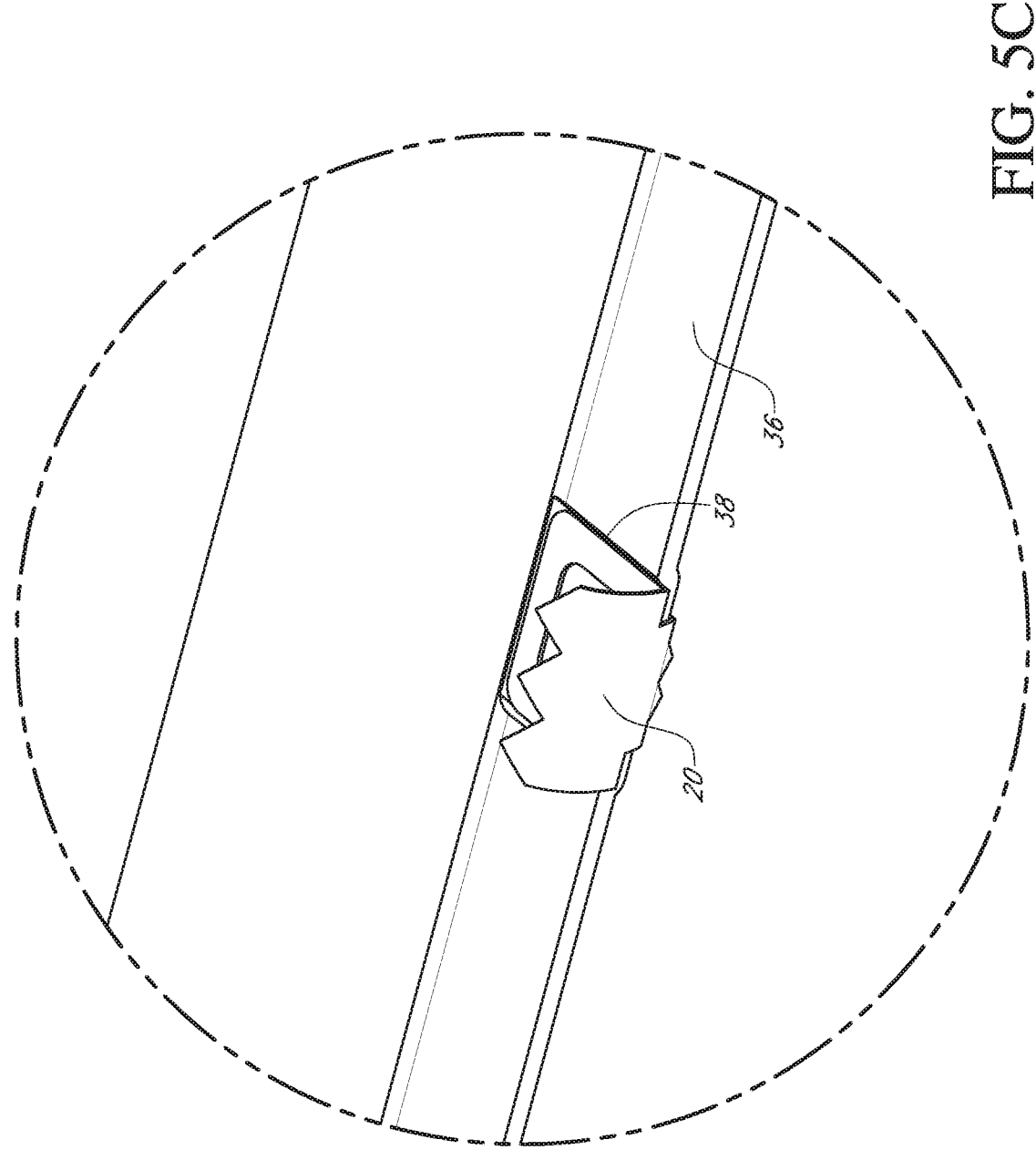
FIG. 5C illustrates another enlarged perspective view of the window deflector assembly of FIG. 5A, with a mounting clip secured to a portion of the window deflector.

FIG. 5A illustrates a perspective view of the window deflector 16 and the one or more mounting clips 20, where some mounting clips 20 are secured to the window deflector 16 and some mounting clips 20 are not secured to (e.g., are detached) the window deflector 16. FIG. 5B illustrates an enlarged perspective view of a mounting clip 20 proximate to the window deflector 16 and recess 38 prior to installation (e.g. securement). FIG. 5C illustrates an enlarged perspective view of a mounting clip 20 secured within a recess 38 of the window deflector 16. The benefits and properties of the retainment of the inner stem 24 within the recess 38 are discussed above. As can be seen, the recess 38 can be sized to receive the inner stem 24 within the recess 38 and/or can have a thickness that is substantially equal to a thickness of the inner stem 24 so that a face (e.g., window-facing face) of the inner stem 24 is flush with a surface of the window deflector 16 (e.g., a face of the first section 36 of window deflector 16) when the mounting clip 20 is secured to the window deflector 16.

The window deflector 16 and one or more mounting clips 20 discussed herein can be secured to one another and/or to a window channel 18 and/or window frame 12 of a vehicle 10 in a variety of different ways and in a variety of different orders. For example, the window deflector 16 and one or more mounting clips 20 can be secured to a window channel 18 and/or window frame 12 of a vehicle 10 by first securing the mounting clip(s) 20 to the window channel 18, and thereafter securing the window deflector 16 to the mounting clip(s) 20. Installation of the window deflector 16 within a window channel 18 and/or window frame 12 may begin be inserting one or more mounting clips 20 into the window channel 18 and/or window frame 12 and securing the one or mounting clips 20 to the window channel 18. The mounting clips 20 can be secured to the window channel 18 by securing first and/or second ends 29, 28 of the top portion 22 of the mounting clips 20 to one or both sides of the window channel 18, as discussed above. After the mounting clips 20 are secured to the window channel 18, one or more portions of the window deflector 16 (such as one or more portions of the first section 36 at recesses 38) can be inserted into a second portion of the mounting clip 20, such as between the inner and outer stems 24, 26 of the mounting clip 20, as described above.

Alternatively, the window deflector 16 and one or more mounting clips 20 can be secured to a window channel 18 and/or window frame 12 of a vehicle by first securing the mounting clip(s) 20 to the window deflector 16, and thereafter securing the mounting clip(s) 20 to the window channel 18 of the window frame 12 of the vehicle 10. For example, the mounting clip(s) 20 can be secured to a first section 36 of the window deflector 16, such as at recess(es) 38. Once the mounting clip(s) 20 are secured to the window deflector 16 in desired locations and/or positions, the assembly can be inserted into the window frame and the mounting clip(s) 20 can be secured to the window channel 18. This approach may be advantageous because it can allow the placement of the one or more mounting clips 20 to be more precise. For example, a user can place the mounting clip(s) 20 in locations along the window deflector 16 so as to distribute the loads (from the attachment) at pre-defined spacings or intervals along the window frame 12 and/or window channel 18. If the mounting clips 20 are placed in the window channel 18 before the window deflector 16 is inserted into the mounting clips 20, the mounting clips 20 may move or be inadvertently pushed by the user and/or window deflector 16 during installation. Further, where the window deflector 16 includes recesses 38, alignment and/or placement of the mounting clips 20 within the recesses 38 can be accomplished much more easily when the clips 20 are attached to the window deflector 16 prior to installation of the assembly to the window channel 18.

As discussed above, the top portion 22 of the mounting clip(s) 20 can be curved downwardly toward the first end 29 and curved downwardly toward the second end 28. As also discussed, this curvature can advantageously make installation of the mounting clips 20 within the channel 18 more efficient as it provides less resistant when the top portion 22 is pushed upward in the window channel 18, especially where the window channel 18 includes flared portion(s) 15.

From the foregoing description, it will be appreciated that an inventive window deflector assembly is disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A window deflector assembly for a window frame of a vehicle, comprising:
    a window deflector comprising a first section configured to extend upward into the window frame when the window deflector assembly is installed and a second section configured to extend below the window frame when the window deflector assembly is installed, wherein the first section is integral with the second section; and
    one or more mounting clips configured to secure to a window channel within the window frame, each of the one or more mounting clips comprising:
        a top portion having a first end configured to engage a first side of the window channel and a second end configured to engage a second side of the window channel;
        an outer stem extending from the top portion; and
        an inner stem extending from the top portion and spaced from the outer stem, the space between the outer and inner stems configured to receive and grip a portion of the first section of the window deflector, wherein the inner stem comprises a first face and a second face opposite the first face, the first face facing and positioned adjacent to the first section of the window deflector when the window deflector is secured between the outer and inner stems;
    wherein, when the window deflector assembly is installed in the window frame and a window of the vehicle is in a closed position, the second face of the inner stem faces and is positioned proximate to the window.

2. The window deflector assembly of claim 1, wherein the first end of the top portion comprises a plurality of laterally spaced engagement portions configured to extend outward beyond an end of at least one protrusion on the first side of the window channel.

3. The window deflector assembly of claim 2, wherein each of the plurality of laterally spaced engagement portions are tapered to form a pointed tip.

4. The window deflector assembly of claim 2, wherein the second end of the top portion comprises a plurality of laterally spaced engagement portions configured to extend outward beyond an end of at least one protrusion on the second side of the window channel.

5. The window deflector assembly of claim 1, wherein the window channel is rubber.

6. The window deflector assembly of claim 1, wherein the top portion is curved downwardly toward the first end and curved downwardly toward the second end.

7. The window deflector assembly of claim 6, wherein each of the first and second ends of the top portion comprises at least one engagement portion configured to extend outward beyond an end of at least one protrusion on the first side of the window channel or the second side of the window channel and configured to engage the at least one protrusion, wherein the at least one protrusion is angled such that when engaged by the at least one engagement portion, a contacting surface of the at least one protrusion lays adjacent to a contacting surface of the at least one engagement portion.

8. The window deflector assembly of claim 1, wherein the outer stem has a cantilevered end which is flared towards the first side of the window channel and is configured to engage a protrusion on the window channel.

9. The window deflector assembly of claim 1, wherein the outer stem comprises one or more engagement portions configured to engage the portion of the first section of the window deflector when secured between the outer and inner stems.

10. The window deflector assembly of claim 1, wherein the portion of the first section of the window deflector defines a recess, and wherein the recess is sized to receive the inner stem.

11. The window deflector assembly of claim 10, wherein a thickness of the recess is substantially equal to a thickness of the inner stem.

12. The window deflector assembly of claim 11, wherein the thickness of the recess is within 10% of the thickness of the inner stem.

13. A vehicle, comprising:
- a window frame comprising an interior side positioned adjacent to an interior of the vehicle and an exterior side opposite the interior side;
- a window channel positioned within the window frame, the window channel comprising an interior side adjacent to the interior side of the window frame and an exterior side adjacent to the exterior side of the window frame;
- a window deflector comprising a first section extending upward into the window frame and a second section extending below the window frame, wherein the first section is integral with the second section;
- a mounting clip retained within said window channel, the mounting clip comprising a first portion which engages both the exterior and interior sides of the window channel and a second portion which grips opposite sides of a portion of the first section of the window deflector.

14. The vehicle of claim 13, wherein the second portion of the mounting clip comprises an inner stem and an outer stem spaced from the inner stem, and wherein the portion of the first section of the window deflector defines a recess which receives the inner stem of the mounting clip.

15. The vehicle of claim 14, wherein a thickness of the recess is substantially equal to a thickness of the inner stem so that a face of the inner stem and a surface of the first section of the window deflector adjacent to the recess are flush.

16. The vehicle of claim 13, wherein the first portion of the mounting clip comprises a first end which engages the exterior side of the window channel and a second end which engages the interior side of the window channel, and wherein the first portion is curved downwardly toward the first end and curved downwardly toward the second end.

17. A method of installing a window deflector in a window frame of vehicle, the method comprising:
- inserting a mounting clip into the window frame and securing a first portion of the mounting clip to both an interior side and an exterior side of a window channel positioned within the window frame; and
- inserting a first section of the window deflector into a second portion of the mounting clip, the second portion of the mounting clip configured to grip opposite sides of a portion of the first section of the window deflector within the window channel positioned within the window frame.

18. The method of claim 17, wherein the step of inserting the first section of the window deflector into the second portion of the mounting clip is carried out before the step of inserting the mounting clip into the window frame.

19. The method of claim 17, wherein the first portion of the mounting clip comprises a first end and a second end, and wherein the first portion is curved downwardly from the first end to the second end.

20. The method of claim 17, wherein:
- the second portion of the mounting clip comprises an inner stem and an outer stem spaced from the inner stem;
- the first section of the window deflector comprises a recess; and
- the step of inserting the first section of the window deflector into the second portion of the mounting clip comprises inserting the first section of the window deflector between the inner and outer stems such that the inner stem is positioned at least partially within the recess.

\* \* \* \* \*